United States Patent
Swanick

(10) Patent No.: US 10,808,054 B2
(45) Date of Patent: Oct. 20, 2020

(54) SELF-BONDING FLUOROPOLYMERS AND METHODS OF PRODUCING THE SAME

(71) Applicant: Atrium Medical Corporation, Hudson, NH (US)

(72) Inventor: Thomas M. Swanick, Hillsborough, NH (US)

(73) Assignee: ATRIUM MEDICAL CORPORATION, Merrimack, NH (US)

( * ) Notice: Subject to any disclaimer, the term of this patent is extended or adjusted under 35 U.S.C. 154(b) by 516 days.

(21) Appl. No.: 13/839,756

(22) Filed: Mar. 15, 2013

(65) Prior Publication Data
US 2014/0099461 A1    Apr. 10, 2014

Related U.S. Application Data

(60) Provisional application No. 61/711,996, filed on Oct. 10, 2012.

(51) Int. Cl.

| | |
|---|---|
| C08F 14/26 | (2006.01) |
| B32B 27/08 | (2006.01) |
| B32B 27/32 | (2006.01) |
| B32B 3/04 | (2006.01) |
| C08J 5/12 | (2006.01) |
| B29C 65/00 | (2006.01) |
| B32B 7/02 | (2019.01) |
| B32B 27/06 | (2006.01) |
| B29C 65/02 | (2006.01) |
| B29C 65/82 | (2006.01) |
| B29K 105/04 | (2006.01) |

(52) U.S. Cl.
CPC .............. *C08F 14/26* (2013.01); *B29C 65/02* (2013.01); *B29C 65/8253* (2013.01); *B29C 66/1122* (2013.01); *B29C 66/1162* (2013.01); *B29C 66/14* (2013.01); *B29C 66/43* (2013.01); *B29C 66/4322* (2013.01); *B29C 66/45* (2013.01); *B29C 66/71* (2013.01); *B29C 66/73921* (2013.01); *B32B 3/04* (2013.01); *B32B 7/02* (2013.01); *B32B 27/06* (2013.01); *B32B 27/08* (2013.01); *B32B 27/322* (2013.01); *C08J 5/121* (2013.01); *B29K 2105/04* (2013.01); *B32B 2307/702* (2013.01); *B32B 2307/704* (2013.01); *B32B 2437/00* (2013.01); *B32B 2535/00* (2013.01); *B32B 2553/00* (2013.01); *C08J 2327/18* (2013.01); *Y10T 428/139* (2015.01); *Y10T 428/1352* (2015.01); *Y10T 428/192* (2015.01); *Y10T 428/24752* (2015.01); *Y10T 428/31544* (2015.04)

(58) Field of Classification Search
None
See application file for complete search history.

(56) References Cited

U.S. PATENT DOCUMENTS

| | | | |
|---|---|---|---|
| 3,953,566 A | | 4/1976 | Gore |
| 4,096,227 A | * | 6/1978 | Gore ...................... B01D 71/36 264/110 |
| 5,064,593 A | * | 11/1991 | Tamaru .................. B01D 69/12 264/113 |
| 5,556,426 A | | 9/1996 | Popadiuk et al. |
| 5,688,836 A | | 11/1997 | Yamamoto et al. |
| 6,203,735 B1 | | 3/2001 | Edwin et al. |
| 6,616,876 B1 | * | 9/2003 | Labrecque ................. A61F 2/06 264/109 |
| 7,923,165 B2 | | 4/2011 | Smotkin |
| 2004/0236308 A1 | | 11/2004 | Herweck et al. |
| 2006/0032813 A1 | | 2/2006 | Ieraci et al. |
| 2009/0036971 A1 | * | 2/2009 | Humphrey .............. A61L 27/16 623/1.15 |
| 2009/0036973 A1 | | 2/2009 | Humphrey et al. |
| 2010/0323277 A1 | | 12/2010 | Roberts |

OTHER PUBLICATIONS

International Search Report for International Application PCT/US2013/064016, dated Dec. 20, 2013.
Merriam-Webster's Collegiate Dictionary (10th Ed.) 653 (1993).
Written Opinion issued in International Application No. PCT/US2013/064016, dated Dec. 20, 2013, 7 pages.
International Preliminary Report on Patentability issued in International Application No. PCT/US2013/064016, dated Apr. 23, 2015, 9 pages.
Adhesion and Silicone Adhesives, NuSil Technology, L.L.C. downloaded from http://www.eimmedical.com/Adhesion%20Application%20Note on Jan. 6, 2015, 12 pages.

* cited by examiner

*Primary Examiner* — Callie E Shosho
*Assistant Examiner* — Patrick N English
(74) *Attorney, Agent, or Firm* — Wesley Scott Ashton

(57) ABSTRACT

A method of making expanded fluoropolymer articles thermally bonds portions of expanded fluoropolymers together, without using an adhesive or crushing force, to produce stronger bonds at the joint between the expanded fluoropolymers than the bonds within the constituent expanded fluoropolymers. The method involves placing the portions of expanded fluoropolymers to be thermally bonded together in intimate contact with each other after wet-stretching the expanded fluoropolymers, and removing the wetting agent used to wet-stretch the expanded fluoropolymers, without subsequent expansion or stretching, to yield an expanded fluoropolymer article exhibiting unexpected and superior properties that can be used in a variety of medical and industrial applications.

32 Claims, 22 Drawing Sheets

SELF-BONDING FLUOROPOLYMERS AND METHODS OF PRODUCING THE SAME

RELATED APPLICATION

This application claims priority to, and the benefit of, U.S. Provisional Application No. 61/711,996, filed Oct. 10, 2012, for all subject matter common to both applications. The disclosure of said provisional application is hereby incorporated by reference in its entirety.

FIELD OF THE INVENTION

The present invention relates to fluoropolymers, and the bonding thereof, suitable for a wide variety of applications, such as medical devices (e.g., grafts, stent covers, etc.) and industrial uses (e.g., clothing and apparel, packaging, etc.). More particularly, the present invention provides expanded fluoropolymer articles thermally bonded to themselves without requiring adhesives, and multi-layer fluoropolymer articles comprising layers that are thermally bonded without requiring adhesives.

BACKGROUND OF THE INVENTION

Certain classes of polymers, such as Polytetrafluoroethylene (PTFE) and Ultra High Molecular Weight Polyethylene (UHMWPE), possess the unique ability to physically expand as a result of applied force and temperature. Molecularly, PTFE is a long chain polymer molecule consisting of carbon and fluorine atoms that exists in varying degrees of crystallinity. PTFE is a semi-crystalline material, consisting of amorphous and crystalline regions within the bulk material.

The crystallinity of polymers is characterized by their degree of crystallinity, ranging from zero for an amorphous polymer to one for a theoretical completely crystalline polymer. As would be appreciated by one of skill in the art, few polymers are entirely crystalline. In general, in the amorphous regions, the polymer chains exist in a random pattern, whereas in the crystalline regions, the polymer chains exist in a regular, repeating (e.g., periodic) pattern. The degree of crystallinity, along with size, distribution, and physical arrangement of the crystalline regions, has a significant effect on the physical and mechanical properties of the polymer. For example, polymers with high crystallinity are reported to be stronger and denser than amorphous polymers.

PTFE can be expanded under the application of force at elevated temperatures. Expansion can take place in a number of different ways and directions, so as to modify the length, width, and/or shape of the PTFE article. During the expansion process, open pores are created, and the resulting expanded PTFE article is a porous material with increased permeability and flexibility, and decreased density and strength. Expansion processes do not induce a change in crystallinity unless the material is heated above its melting point.

In many applications, the porosity and permeability of expanded PTFE must be reduced to achieve the particular desired physical material properties and performance criteria. Conventional methods to reduce porosity and permeability of a material include compression of the material under a crushing pressure (e.g., calendaring, or another pressure that tends to crush the materials together). However, such resultant compressed materials often fail to have the desired physical strengths, particularly when compressed to a very small thickness, and are often less flexible or pliable, with less ability to drape and conform to a targeted tissue location during implantation.

Furthermore, fluoropolymers, particularly PTFE, are extremely difficult to bond with each other due to the inertness, low surface energy, and chemical structure of the material. Conventional methods of bonding PTFE include chemical etching, plasma etching, corona treatment, and combined application of crushing force and heat. In some instances, adhesives and tie layers are used to bond PTFE together.

However, these methods can produce undesired surface modifications to the PTFE material, or they can involve the undesired addition of foreign agents (e.g., adhesives, etc.) to the PTFE material.

SUMMARY

There is a need for a thin PTFE material having high strength characteristics. There is also a need for a PTFE material capable of forming bonds with itself that are stronger than the natural bonds of remaining portions the PTFE material that are not bonded to itself (self-bonded). The present invention is directed toward solutions to address these and other needs, in addition to having other desirable characteristics that will be appreciated by one of skill in the art upon reading the present specification. In accordance with one aspect of the present invention, an expanded fluoropolymer is provided. The expanded fluoropolymer can be thermally bonded to itself without an adhesive. The expanded fluoropolymer can be constructed from PTFE. In some embodiments, the expanded fluoropolymer is nonporous. In some embodiments, at least two portions of the fluoropolymer can be bonded together without the adhesive to form bonds that have an x-direction tensile strength that is greater than the x-direction tensile strength of the fluoropolymer itself. The fluoropolymer can be constructed to form any shape, for example, a sheet, a film, a tube, a balloon or a 3-d shape.

In accordance with another aspect of the present invention, a multi-layer expanded fluoropolymer article is provided. The multi-layer expanded fluoropolymer article can include at least two layers of expanded fluoropolymer thermally bonded together without an adhesive.

In accordance with some embodiments of the present invention, the at least two layers can be arranged such that the entire surface of each individual layer forms bonds with an entire surface of each adjacent layer. Each layer can be arranged in a vertical relationship with respect to each adjacent layer. The bonds can have a z-direction strength that is greater than a z-direction strength of any of the individual layers.

In accordance with some embodiments of the present invention, each of the layers can be arranged such that a portion of the surface of each individual layer overlaps each adjacent layer and the overlapping portion of each adjacent layer forms bonds with each other. In certain embodiments, each of the layers can be arranged in a vertical relationship with respect to each adjacent layer. In such embodiments, the bonds can have a z-direction strength that is greater than a z-direction strength of any individual layers. In other embodiments, each layer is arranged in a horizontal relationship with respect to each adjacent layer. In such embodiments, the bonds can have an x-direction tensile strength that is greater than an x-direction tensile strength of the expanded fluoropolymer layers. The article can be constructed to form any shape, for example, a sheet, a film, a tube, a balloon, and a 3-d shape.

In accordance with another aspect of the present invention, a method of making an expanded fluoropolymer article thermally bonded to itself without an adhesive is provided. In the method, a wet stretched fluoropolymer article can be provided by stretching a wetted expandable fluoropolymer article while wet with a wet stretch wetting agent. Two portions of the wet stretched fluoropolymer article can be placed in intimate contact with each other while wet with the wet stretch wetting agent. While the two portions of the wet stretched fluoropolymer article are in intimate contact with each other, at least the wet stretch wetting agent can be removed from at least the two portions of the wet stretched fluoropolymer article in intimate contact. Subsequent to or simultaneous with removing at least the wet stretch wetting agent from at least the two portions of the wet stretched fluoropolymer article, at least the two portions of the wet stretched fluoropolymer article can be heated while in intimate contact with each other.

In accordance with some embodiments of the present invention, the step of heating at least the two portions of the wet stretched fluoropolymer article can form bonds between the two portions. The bonds between the two portions can have an x-direction tensile strength that is greater than an x-direction tensile strength of the wet stretched fluoropolymer article itself. In some embodiments, the expanded fluoropolymer article includes ePTFE. The ePTFE can be non-porous. In some embodiments, the two portions of the wet stretched fluoropolymer article can remain in intimate contact between the step of removing at least the wet stretch wetting agent and the step of heating at least the two portions of the wet stretched fluoropolymer article.

In accordance with some embodiments of the present invention, the step of providing the wet stretched fluoropolymer article can include: (a) mixing an expandable fluoropolymer resin with an extrusion wetting agent; (b) forming the mixture into a solid billet; (c) extruding the billet to form an extrudate; (d) rewetting the extrudate with the wet stretch wetting agent to form the wetted expanded fluoropolymer article; and (e) stretching the wetted article to form the wet stretched fluoropolymer article. In some embodiments, the extrudate is calendared to reduce a thickness of the extrudate prior to the step of rewetting the extrudate with the wet stretch wetting agent. The extrudate can be stretched in the machine direction prior to the step of rewetting the extrudate with the wet stretch wetting agent. Stretching the wetted expandable fluoropolymer article can include stretching the wetted expandable fluoropolymer article in the transverse direction at a temperature below the flash point of the wet stretch wetting agent. The extrusion wetting agent can be removed from the extrudate prior to the step of rewetting the extrudate with the wet stretch wetting agent. The step of removing at least the wet stretch wetting agent from at least the two portions of the wet stretched fluoropolymer article further can include removing the lubricant wetting agent from at least the two portions of the wet stretched fluoropolymer article.

The step of placing the two portions of the wet stretched fluoropolymer article in intimate contact can include wrapping the wet stretched fluoropolymer article around a mandrel in such a way that the two portions of wet stretched fluoropolymer article are overlapping. The step of removing at least the wet stretch wetting agent from at least the two portions of the wet stretched fluoropolymer article can include removing by drying or removing by heating. The step of heating at least the two portions of the wet stretched fluoropolymer article can include sintering at least the two portions of the wet stretched fluoropolymer article while in intimate contact.

In accordance with another aspect of the present invention, a method is provided for making a multi-layer expanded fluoropolymer article. In the method, each of a first wet stretched fluoropolymer article and a second wet stretched fluoropolymer article can be provided by stretching a wetted expandable fluoropolymer article. A portion of the first wet stretched fluoropolymer article can be placed in intimate contact with a portion of the second wet stretched fluoropolymer article while each of the first and second wet stretched fluoropolymer articles is wet with a wet-stretch wetting agent. While in intimate contact, the wet-stretch wetting agent can be removed at least from the portion of each of the first and second wet stretched fluoropolymer articles. Subsequent to or simultaneous with removing the wet-stretch wetting agent at least from the portion of each of the first and second wet stretched fluoropolymer articles, at least the portion of each of the first and second wet stretched fluoropolymer articles can be heated while in intimate contact.

In accordance with some embodiments of the present invention, the step of heating the portion of each of the first and second wet stretched fluoropolymer articles while in intimate contact can cause bonds to be formed between the portion of the first wet stretched fluoropolymer article and the second wet stretched fluoropolymer article. The bonds can have an x-direction tensile strength that is greater than an x-direction tensile strength of the first or second wet stretched fluoropolymer articles. Each of the first and second expanded fluoropolymer articles can include ePTFE. The ePTFE can be non-porous.

In accordance with some embodiments of the present invention, providing each of the first and the second wet stretched fluoropolymer articles can include: (a) mixing an expandable fluoropolymer resin with an extrusion wetting agent to form a mixture; (b) extruding the mixture to form the expandable fluoropolymer extrudate; (c) rewetting the extrudate with the wet-stretch wetting agent to form the wetted expandable fluoropolymer article; and (d) stretching the wetted expandable fluoropolymer article to form the wet stretched fluoropolymer article. The mixture can be formed into a solid billet prior to being extruded. In some embodiments, the expandable fluoropolymer extrudate is calendared to reduce a thickness of the expandable fluoropolymer extrudate prior being rewetted. The expandable fluoropolymer extrudate can be stretched in the machine direction prior to being rewetted. The wetted expandable fluoropolymer article can be stretched in the transverse direction at a temperature below the flash point of the wet-stretch wetting agent. In some embodiments, the lubricant wetting agent is removed from the expandable fluoropolymer extrudate prior to being rewetted. In removing the wet-stretch wetting agent from at least from the portion of each of the first and second wet stretched fluoropolymer articles, the lubricant wetting agent can also be removed from each of the first and second wet stretched fluoropolymer articles.

In accordance with some embodiments of the present invention, the step of removing the wet-stretch wetting agent from at least the portion of each of the first and second wet stretched fluoropolymer articles can be performed at least in part through use of drying or heating. The step of heating at least the portion of each of the first and second wet stretched fluoropolymer articles can include sintering at least the portion of each of the first and second wet stretched fluoropolymer articles while in intimate contact.

In accordance with another aspect of the present invention, an expanded fluoropolymer article is provided having a longitudinal tensile strength at break of at least 8.12 lbf (16,186 psi) on a 0.0005 inch thick sheet as measured according to ASTM D882.

In accordance with some further embodiments of the present invention, the article is formed as a sheet having a thickness of 0.0005 inches and has a joint strength at failure of about 4.2 lbf (about 8,400 psi), as measured according to ASTM D882. In some embodiments, the article is formed as a 1" diameter tube having a thickness of 0.0005 inches and has a radial tensile strength of about 14.76 lbf (about 29,520 psi) as measured according to ASTM D882. In some embodiments, the article is formed as a 0.0005 inch thick film having about 900 perforations per square inch of approximately 100 microns, and has a longitudinal tensile strength of about 5.73 lbf (about 11,452 psi), as measured according to ASTM D882. In some embodiments, the article is formed as a 0.0005 inch thick film having about 1,600 perforations per square inch of approximately 100 microns and has a longitudinal tensile strength of 4.4 lbf (8,816 psi), as measured according to ASTM D882. In some embodiments, the article is formed as a 0.0005 inch thick film having about 2,500 perforations per square inch of approximately 100 microns, and has a longitudinal tensile strength of about 2.53 lbf (about 5,066 psi), as measured according to ASTM D882.

In accordance with some embodiments of the present invention, the article can have a water contact angle of at least 115° (117.86°). In some embodiments, the article has an acid contact angle of at least 115° (115.2°). The article can be capable of being laminated without an adhesive or chemical or physical treatment. The article can have a T-peel loading value of between about 6 lbf and about 8 lbf (6.91 lbf). In some embodiments, the article has a T-peel loading value is 3500% higher than conventionally processed PTFE (e.g., via known processes of lubricating PTFE resin, preforming, extruding, calendaring, removing lubrication, and stretching in the machine direction). The article can have a greater amorphous fraction than PTFE, as detected by Fourier transform infrared analysis. The article can have a greater relative amorphous fraction than PTFE, characterized by a differential scanning calorimetry (DSC) thermogram exhibiting a phase transition of less than 20 degrees Celsius and a heat of fusion of less than 4.0 joules per gram. The article can be shaped to form a sheet, a film, a tube, a balloon, or a 3-d shape.

In accordance with some embodiments of the present invention, the article is thermally self-bonded or thermally self-laminated without application of a chemical treatment to the article. In some embodiments, the article is thermally self-bonded or thermally self-laminated without an adhesive. In some embodiments, the article is capable of being thermally laminated to itself without application of a chemical treatment to the article. In some embodiments, the article is capable of being thermally laminated to itself without an adhesive.

In accordance with another aspect of the present invention, an expanded fluoropolymer is provided that includes a wet-stretched polytetrafluoroethylene (ePTFE) exhibiting both a higher amorphous fraction and a lower crystalline fraction than an expanded polymer formed from a comparative non-wet-stretched ePTFE, as characterized by a DSC thermogram. In some embodiments, the DSC thermogram of the wet-stretched ePTFE exhibits a phase transition of at least 2 degrees Celsius less than the DSC thermogram of the non-wet-stretched ePTFE. In some embodiments, the DSC thermogram of the wet-stretched ePTFE exhibits a heat of fusion of 0.75 joules per mole less than the DSC thermogram of the non-wet-stretched ePTFE.

In accordance with some further embodiments of the present invention, the wet-stretched ePTFE is thermally bonded to itself without application of a crushing force or chemical treatment to the wet-stretched ePTFE. In some embodiments, the wet-stretched ePTFE is thermally bonded to itself without an adhesive. The wet-stretched ePTFE can be capable of being thermally bonded to itself without application of a crushing force or chemical treatment to the wet-stretched ePTFE. In some embodiments, the wet-stretched ePTFE is capable of being thermally bonded to itself without an adhesive.

In accordance with yet another aspect of the present invention, an expanded fluoropolymer material is provided having a bond strength at the joint greater than the bond strength of the material itself when at least a portion of the wet-stretched fluoropolymer is sintered to itself in a joined configuration. The expanded fluoropolymer material can be produced by (a) stretching a wetted fluoropolymer material to form a wet-stretched fluoropolymer material; (b) removing a wetting agent from the wet-stretched fluoropolymer material while portions of the wet-stretched fluoropolymer material are in intimate contact with each other after stretching the wetted fluoropolymer material; and (c) sintering the at least the portion of the expanded fluoropolymer material to itself to in the joined configuration to yield the wet-stretched fluoropolymer material having the bond strength at the joint greater than the bond strength of the material itself.

In accordance with another aspect of the present invention, a product is provided that includes at least one component that is constructed from an expanded fluoropolymer material. The expanded fluoropolymer material can include a liquid-impermeable, shape-formable wet-stretched fluoropolymer material. At least a portion of the wet-stretched fluoropolymer material can be sintered to itself in a joined configuration. The joint strength of the wet-stretched fluoropolymer material can be at least 7 times greater than the joint strength of an expanded polytetrafluoroethylene material similarly configured. The product can be a medical device, for example, a graft, a conduit, a catheter, a bariatric liner, a balloon, or a stent covering.

In accordance with yet another aspect of the present invention, a polymorph of polytetrafluoroethylene (PTFE) is provided that has an amorphous fraction characterized by a differential scanning calorimetry (DSC) thermogram exhibiting a phase transition of less than 20 degrees Celsius and a heat of fusion of less than 4.0 joules per gram. The polymorph is thermally laminated to itself without an adhesive. In some embodiments, the PTFE polymorph is a low crystallinity polymer as compared to PTFE, wherein PTFE is a high crystallinity polymer. The low crystallinity polymer can have a melting point as determined by DSC that is less than the melting point of the high crystallinity polymer.

BRIEF DESCRIPTION OF THE FIGURES

These and other characteristics of the present invention will be more fully understood by reference to the following detailed description in conjunction with the attached drawings, in which:

As shown in FIG. 11, the lamination strength of the fluoropolymer articles of the present invention is unexpectedly and surprisingly significantly higher than the lamination strength of the ePTFE articles;

DETAILED DESCRIPTION

Figure 1:
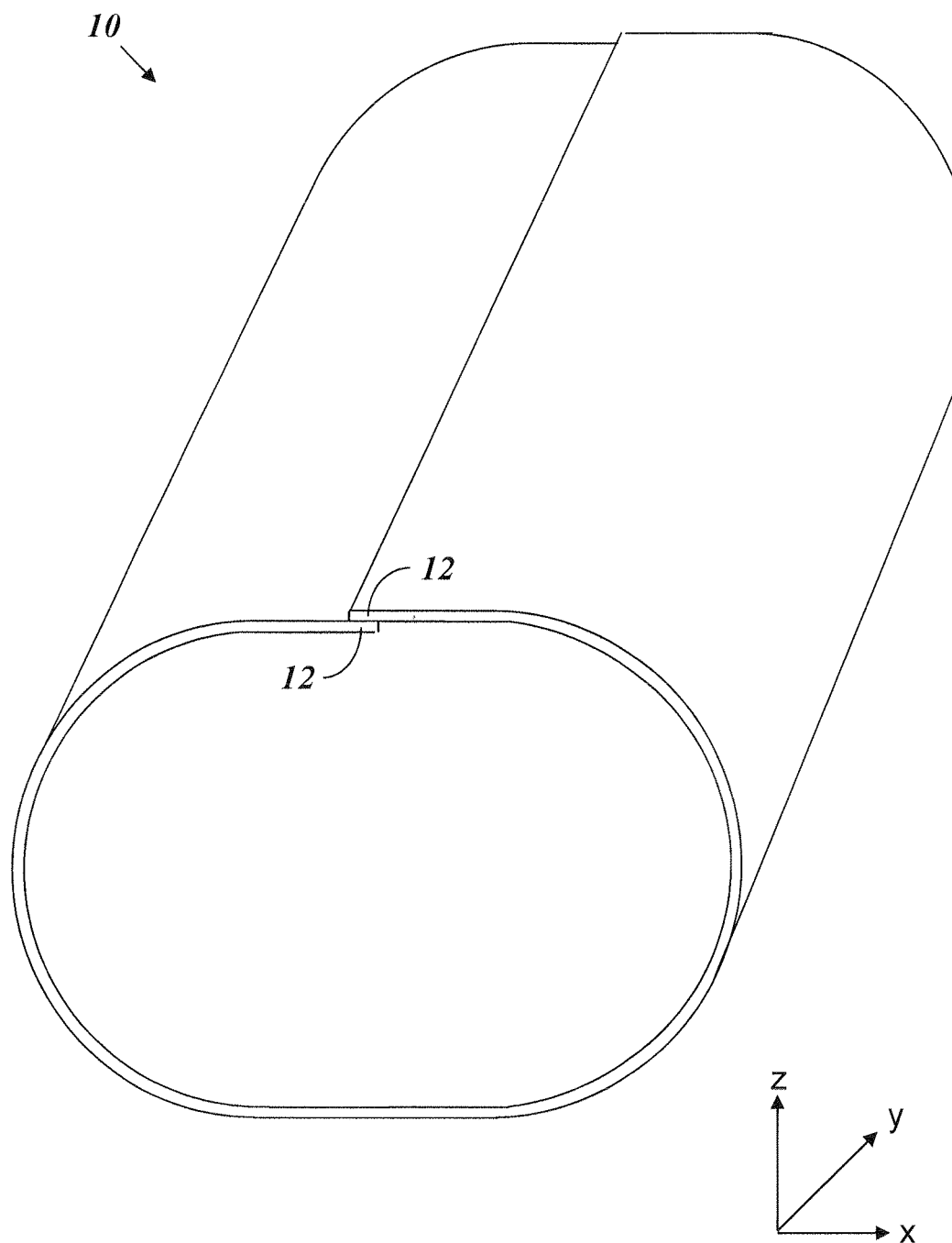
FIG. 1 is a perspective view of an expanded fluoropolymer article thermally bonded to itself without the use of adhesives, according to an example embodiment of the present invention.

An illustrative embodiment of the present invention relates to an expanded fluoropolymer thermally bonded to itself without using an adhesive and methods for producing the same. In certain illustrative embodiments, a joining force can optionally be applied to the expanded fluoropolymer to thermally bond the expanded fluoropolymer to itself without using an adhesive. In such illustrative embodiments, the expanded fluoropolymer can be thermally bonded to itself without the use of a "crushing force," as defined herein and would be understood by one of skill in the art. The expanded fluoropolymers of the present invention (EFPs) possesses both superior and unexpected properties compared to conventional fluoropolymers, such as ePTFE processed according to conventional methods. It has surprisingly and unexpectedly been observed that the expanded fluoropolymers formed by the methods of the present invention possess increased density, decreased porosity, increased longitudinal and radial tensile strength, decreased crystallinity and increased amorphousness, and an ability to expand to a larger ratio than conventional fluoropolymers (e.g., as described in U.S. Pat. No. 6,616,876). In certain embodiments, expanded fluoropolymers formed by the methods of the present invention are non-porous. The expanded fluoropolymers formed by the methods of the present invention also possess the unexpected and surprising ability to thermally bond to themselves without using an adhesive (and optionally by applying a joining force), and once bonded as such, the resulting bond exhibits a bond strength at the interface between thermally bonded portions of the expanded fluoropolymer that is greater than the strength of the expanded fluoropolymer itself. It was surprisingly and unexpectedly observed that the expanded fluoropolymers of the present invention having superior properties compared to conventionally processed ePTFE can be formed by removing a wetting agent from a wet-stretched fluoropolymer material (the wetting agent being wetting fluid that was previously added to the extruded material prior to wet stretching) while portions of the wet-stretched fluoropolymer material remain in intimate contact with each other (i.e. the portions of wet-stretched fluoropolymer material to be bonded together are placed into intimate contact with each other after stretching). In certain illustrative embodiments, the intimately contacted portions can optionally be sintered.

FIGS. 1 through 17C, wherein like parts are designated by like reference numerals throughout, illustrate example embodiments of methods of forming, superior and unexpected properties, and applications for the expanded fluoropolymers according to the present invention. Although the present invention will be described with reference to the example embodiments illustrated in the figures, it should be understood that many alternative forms can embody the present invention. One of skill in the art will additionally appreciate different ways to alter the parameters of the embodiments disclosed, such as the size, shape, or type of elements or materials, in a manner still in keeping with the spirit and scope of the present invention.

As utilized herein, a "joining force" generally refers to brief application of a low magnitude force sufficient to bring two items or portions into contact. A joining force is distinguished herein from a "crushing force," which refers to an application (e.g., a prolonged application) of a moderate to high magnitude force used in crushing one or more materials (e.g., together, as performed in machine pressing or calendaring). Accordingly, the meaning of these terms will be fully appreciated by one of skill in the art upon reading the present specification. In accordance with one example embodiment of the present invention, the pressure resulting from the joining force can be about 25 psi or less.

FIG. 1 depicts an illustrative and non-limiting example of an expanded fluoropolymer article 10 thermally bonded to itself without using an adhesive. In certain embodiments, the expanded fluoropolymer article 10 can be thermally bonded to itself without using an adhesive. In certain illustrative embodiments, a joining force can optionally be applied to the expanded fluoropolymer article 10 as the expanded fluoropolymer article 10 is thermally bonded to itself without the adhesive. It is well known in the art that bonding fluoropolymer articles, particularly PTFE, together is difficult to achieve as a result of the inertness, low surface energy, and chemical structure of the fluoropolymers. As a result, conventional methods of bonding fluoropolymer articles together rely on chemical treatment, such as chemical etching, plasma etching, corona treatment, and/or typically require the combined use of a crushing force and heat, or the use of adhesives or tie layers. It was unexpectedly and surprisingly observed during the course of work described herein that by removing a wetting agent (e.g., drying) from a wet-stretched fluoropolymer article while portions of the wet-stretched fluoropolymer article remain in intimate contact with each other, an expanded fluoropolymer article (e.g., the expanded fluoropolymer article 10 illustrated in FIG. 1) capable of thermally bonding to itself or other similarly processed expanded fluoropolymer articles can be produced possessing bonds at the interface or joint between the bonded fluoropolymer portions, the bonds having a strength that is greater than the strength of the expanded fluoropolymer article itself. The wetting agent that is removed is the agent previously added to the extruded material prior to the wet stretching process (such wet stretching process as would be understood by those of skill in the art).

One of skill in the art should appreciate that any suitable fluoropolymer material can be processed according to the methods of the present invention to produce an expanded fluoropolymer article having surprisingly superior properties compared to conventionally processed fluoropolymer articles. In accordance with an illustrative and non-limiting embodiment of the present invention, the expanded fluoropolymer article comprises PTFE. Examples of other suitable materials that can be processed according to the methods of the present invention to produce the superior expanded fluoropolymer articles of the present invention include, but are not limited to, homopolymers of PTFE, copolymers of PTFE in which the comonomer is ethylene, chlorotrifluoroethylene, perfluoroalkoxytetrafluoroethylene, and fluorinated propylene. In certain embodiments, a polyolefin, such as polypropylene and polyethylene, can be used instead of a fluoropolymer. Likewise, polymer materials that are expandable and have a microporous structure similar to ePTFE may also be capable of experiencing the superior properties of the present invention.

In contrast to conventionally processed fluoropolymer materials which are typically porous in nature due to their increased crystalline and decreased amorphous structure, the expanded fluoropolymer articles produced according to the methods of the present invention (e.g., including the expanded fluoropolymer article 10 of FIG. 1) have a decreased porosity. For example, an expanded fluoropolymer article of the present invention can have a decreased porosity as compared to conventionally processed ePTFE. In accordance with an illustrative embodiment of the present invention, the expanded fluoropolymer article is non-porous. It should be appreciated that the degree of porosity can be tailored as desired to suit the needs of any particular intended application, by adjusting the processing conditions. For example, as would be appreciated by one of skill in the art upon reading the present specification, modifications can be made to the wet stretching process (e.g., different parameters can be used) to ensure that the desired porosity of the wet stretched material is achieved. As would further be appreciated by one of skill in the art upon reading the present specification, wet stretching generally produces a decrease in a material's porosity and reduces the thickness of the material being stretched.

As depicted in FIG. 1, at least two portions 12 of the expanded fluoropolymer article 10 can be bonded together without the adhesive to form bonds that have an x-direction tensile strength that is greater than the x-direction tensile strength of the fluoropolymer material itself. In accordance with certain illustrative embodiments, a joining force can optionally be applied to the at least to portions 12 as the at least two portions are being thermally bonded together. Although FIG. 1 shows only two portions 12 of the same expanded fluoropolymer bonded together without adhesive (optionally applying a joining force) to form a tube or tube-like shape, the expanded fluoropolymers of the present invention can be shaped using the inventive methods to form a sheet, a film, a balloon, or any 3-d shape. Furthermore, multiple folds forming more than two portions can be laid over each other, in such a way that three, four, five, six, or N (where N equals a positive integer) portions 12 of the expanded fluoropolymer article 10 are bonded together (e.g., forming a serpentine shape). It should be appreciated that the particular shape formed can vary depending on the particular intended application. For example, if the expanded fluoropolymer article 10 of the present invention is to be used as a balloon for an expandable balloon catheter, the expanded fluoropolymer article 10 can be shaped to form a substantially non-porous balloon (e.g., sealed at one end). By way of further illustration, if the expanded fluoropolymer article 10 of the present invention is to be used as a bariatric liner, the expanded fluoropolymer article 10 can be shaped to form a substantially non-porous, thin film.

Figure 2A:
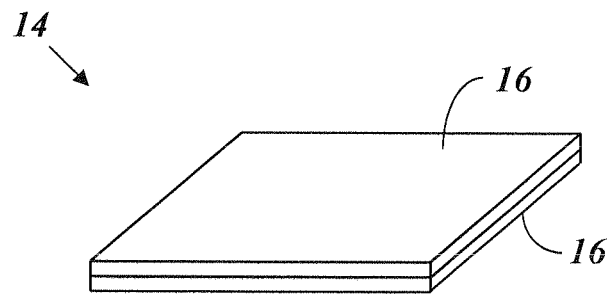
FIG. 2A is a perspective view of a multi-layer expanded fluoropolymer article having a stacked, fully overlapping configuration, according to an example embodiment of the present invention.
Figure 2A:
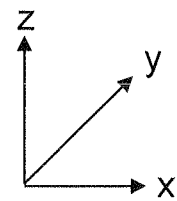
Figure 2B:
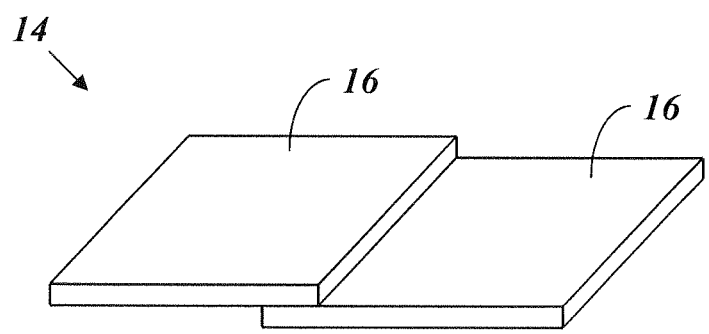
FIG. 2B is a perspective view of a multi-layer expanded fluoropolymer article having a stacked, partially overlapping configuration, according to an example embodiment of the present invention.
Figure 2B:
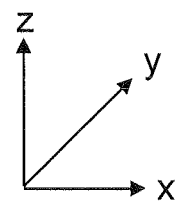

In accordance with an illustrative and non-limiting embodiment of the present invention, FIGS. 2A and 2B depict various embodiments of a multi-layer expanded fluoropolymer article 14 comprising at least two layers 16 of expanded fluoropolymer material thermally bonded together without an adhesive. In accordance with certain illustrative embodiments, a joining force can optionally be applied to the at least two layers 16 of expanded fluoropolymer material as the at least two layers are being thermally bonded together without an adhesive. Although FIGS. 2A and 2B depict the multi-layer expanded fluoropolymer article 14 as having two layers 16, it should be evident to those skilled in the art that the multi-layer expanded fluoropolymer article 14 alternatively can include three layers 16, four layers 16, five layers 16, or up to N layers 16, where N equals a positive integer. The number of layers 16 can vary, as desired, depending on the intended application and desired parameters (e.g., thickness, length, shape, etc.) of the finished article or product.

In accordance with the illustrative and non-limiting embodiment of the present invention shown in FIG. 2A, the at least two layers 16 can be arranged such that the entire surface of each individual layer 16 forms bonds with an entire surface of each adjacent layer 16 (e.g., such that each of the at least two layers 16 is fully overlapping with the other). In such instances, each layer 16 is arranged in a vertical relationship with respect to each adjacent layer 16 and the bonds formed between adjacent layers 16 have a z-direction strength that is greater than a z-direction strength of any of the individual layers 16.

In accordance with the illustrative and non-limiting embodiment of the present invention shown in FIG. 2B, each layer 16 can be arranged such that a portion (i.e., less than an entire surface of a layer) of the surface of each individual layer 16 overlaps each adjacent layer 16 and the overlapping portions of the adjacent layer 16 form bonds with each other. In certain illustrative embodiments, as shown in FIG. 2B, each layer 16 can be arranged in a vertical relationship with respect to each adjacent layer 16. In such instances, the bonds formed between adjacent overlapping layers have a z-direction strength that is greater than a z-direction strength of any individual layers 16.

It should be appreciated, however, that the present invention is not intended to be limited to any such particular vertical arrangement. For example, each layer 16 arranged as such can be arranged such that the area of overlap between each adjacent layer 16 is marginal (i.e., less than about half of the surface area of adjacent layers 16 is overlapping) or substantial (i.e., more than about half of the surface area of adjacent layers 16 is overlapping). In addition, each layer 16 can be arranged so that the multi-layer expanded fluoropolymer article 10 is symmetrical or asymmetrical, forms a particular pattern, e.g., staggered consecutively to form a staircase like shape, staggered alternatively to form an accordion-like shape, etc., or so that each layer 16 has uniform or non-uniform thickness.

Figure 2C:
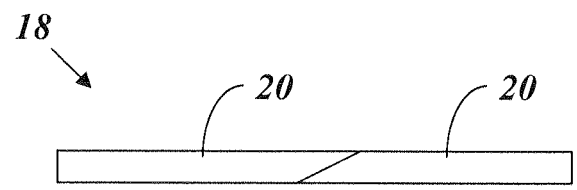
FIG. 2C is a side view of a multi-layer expanded fluoropolymer article having a stacked, partially overlapping configuration in which multiple constituent layers thereof are substantially coplanar, according to an example embodiment of the present invention.
Figure 2C:
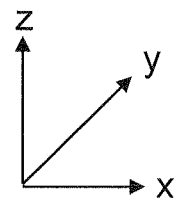

Turning now to the illustrative embodiments shown in FIG. 2C, multiple fluoropolymer articles 10 can be arranged in a horizontal relationship with respect to each other (e.g., in a tile configuration) and can be thermally bonded together without adhesives, so as to form an expanded fluoropolymer article 18 formed of multiple thermally bonded portions 20. In certain illustrative embodiments, a joining force can optionally be applied to the multiple fluoropolymer articles 10 as the multiple fluoropolymer articles are being thermally bonded together without adhesives. In such instances, the expanded fluoropolymer article 18 can include only a single layer, as depicted in FIG. 2C, or may include multiple layers. In such embodiments, the bonds formed between adjacent portions 20 have an x-direction tensile strength that is greater than an x-direction tensile strength of the expanded fluoropolymer article 18 itself. When the portions 20 are arranged in a horizontal relationship with respect to each other, abutting portions 20 can nominally overlap such that the bonds formed therebetween are substantially nonparallel (e.g., perpendicular, sloped at an angle, etc.) to the horizontally arranged portions 20 themselves. Alternatively, in certain embodiments, horizontally arranged portions 20 (e.g., arranged in a tile configuration) can be formed such that there is no overlap between adjacent portions 20. In such instances, the thermally formed bonds thus formed between adjacent portions 20 are substantially parallel to the horizontally arranged portions 20.

Although FIG. 2C shows an expanded fluoropolymer article 18 having two portions 20 arranged side-by-side in series in the x-direction to form a sheet, it should be appreciated that bonds can be formed and additional portions 20 can be added in the x-direction in series. For example, if desired, as described previously herein, a tiled pattern can be formed using multiple portions 20 of expanded fluoropolymer articles all shaped as thin sheets. In such instances, the tensile strength of the bonds formed between adjacent portions 20 in either the x-direction or the y-direction have a greater x-direction tensile strength and a greater y-direction tensile strength than the individual portions 20 themselves.

The expanded fluoropolymer articles 14, 18 of FIGS. 2A through 2C can be processed according to the methods of the present invention to form any desired shape, for example a sheet, a film, a tube, a balloon, and a 3-d shape. It should be appreciated that each layer 16 and/or portion 20 (or the entire article 14, 18) can be thus shaped. In addition, if desired, each layer 16 and/or portion 20 can be formed with distinct shapes, as would be apparent to one of skill in the art.

Figure 3:
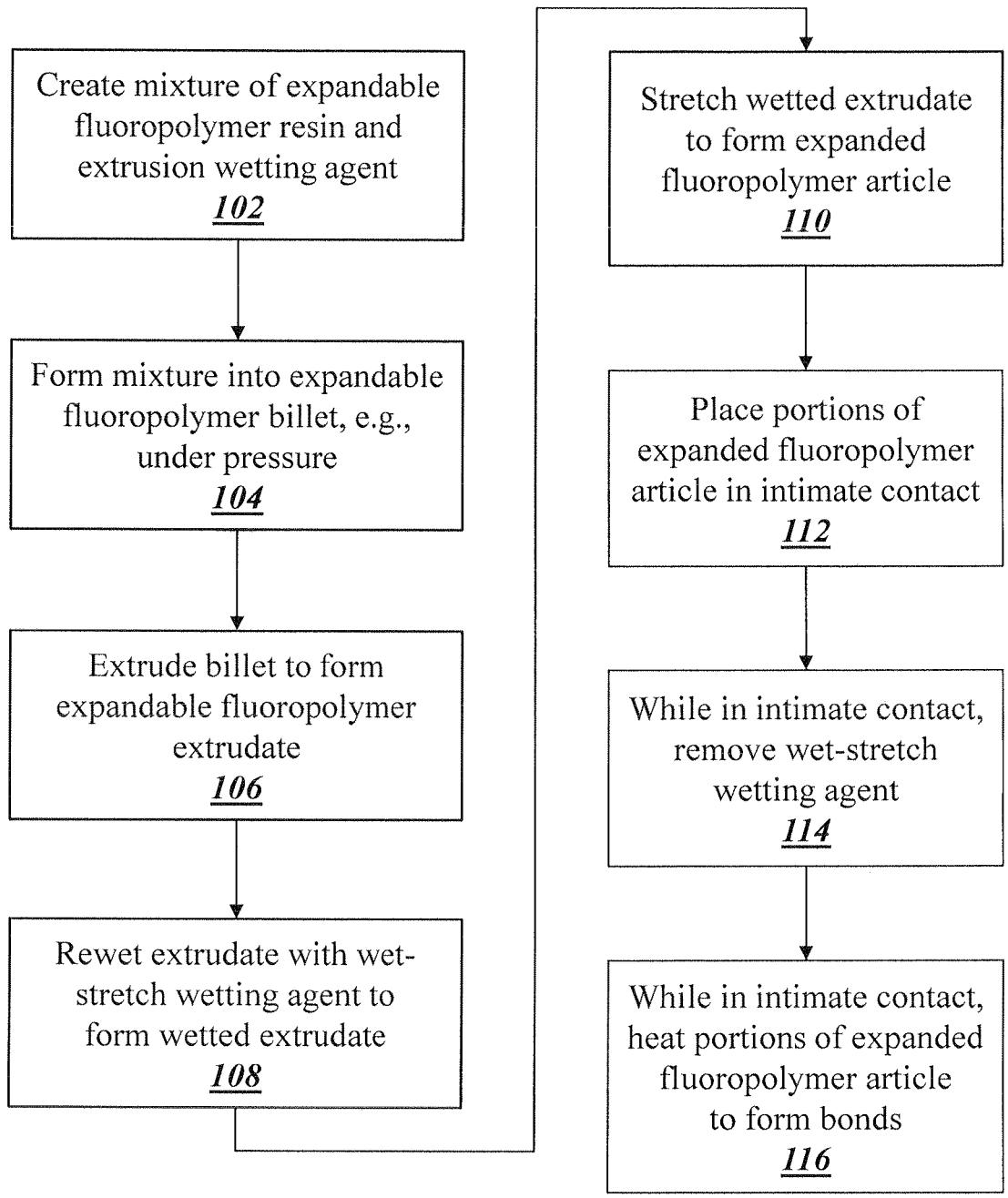
FIG. 3 is a flowchart of a method for making the expanded fluoropolymer article of FIG. 1, according to an example embodiment of the present invention.

FIG. 3 is a flow chart of a method for making an expanded fluoropolymer article, such as the expanded fluoropolymer article 10 of FIG. 1, in accordance with an example embodiment of the present invention. As described previously herein, the expanded fluoropolymer article 10 is thermally bonded to itself without use or requirement of adhesive(s). In certain illustrative embodiments, a joining force can be applied to the expanded fluoropolymer article 10 as the expanded fluoropolymer article is being thermally bonded to itself without the adhesive. The expanded fluoropolymer article generally can include ePTFE, which may be non-porous ePTFE. As depicted in FIG. 3, a mixture of expandable fluoropolymer resin and an extrusion wetting agent can be created (step 102). As used herein, an "extrusion wetting agent" generally refers to a wetting agent that is used in the process of extrusion, e.g., to assist by serving as a lubricant for controlling and/or preventing material shear during extrusion, as would be appreciated by one of skill in the art upon reading the present specification. As a non-limiting example, step 102 of creating the mixture can include blending the fluoropolymer resin with the extrusion wetting agent to form a lubricated powder. The mixture created in step 102 then can be formed, e.g., under pressure, into an expandable fluoropolymer billet (step 104). The expandable fluoropolymer billet can be extruded through a die having any desired cross-section, thereby forming an expandable fluoropolymer extrudate (step 106). As non-limiting examples, the cross-sectional shape of the die can be substantially circular, substantially rectangular, substantially linear (e.g., in such a way as to produce a flat sheet), substantially annular (e.g., in such a way as to produce a hollow cylinder), or the like, as would be readily appreciated by one of skill in the art. Optionally, the expandable fluoropolymer extrudate can be calendared subsequent to step 106 of extrusion, e.g., to reduce a thickness of the expandable fluoropolymer extrudate prior to a subsequent step of stretching. Optionally, the expandable fluoropolymer extrudate can be stretched in the machine direction (e.g., as opposed to the transverse direction), as would be appreciated by one of skill in the art upon reading the present specification.

The expandable fluoropolymer extrudate then may be rewet with a wet-stretch wetting agent, thus forming a wetted expanded fluoropolymer extrudate (step 108). A "wet-stretch wetting agent," as used herein, generally refers to the wetting agent (e.g., a liquid) that is used in the process of wet stretching an article, as would be appreciated by one of skill in the art. "Wet stretching" itself is a pre-existing method of expanding or deforming an expandable polymer-based article while the article is wet with a wetting agent. Step 108 of rewetting the expandable fluoropolymer article with the wet-stretch wetting agent may be performed by submerging or soaking the expandable fluoropolymer in the wet-stretch wetting agent, spraying the wet-stretch wetting agent onto the expandable fluoropolymer article, rubbing the wet-stretch wetting agent into the expandable fluoropolymer article, or otherwise applying the wet-stretch wetting agent to the expandable fluoropolymer article. The term "rewetting" is intended to have its ordinary meaning in the art, e.g., of applying a second wetting agent after completion of one or more activities for which a first wetting agent was intended to have been used. In general, it should be understood that as defined herein, the first wetting agent (e.g., the lubricant wetting agent) can be the same as or different from the second wetting agent (e.g., the wet-stretch wetting agent).

In accordance with conventional wet stretching methods, the wetted expanded fluoropolymer extrudate can be stretched to form an expanded fluoropolymer article (step 110). As would be appreciated by one of skill in the art, in embodiments where the wetted expanded fluoropolymer extrudate is shaped generally like a hollow cylinder, the wetted expanded fluoropolymer extrudate can be stretched by being pulling over a mandrel. This can cause the wetted expanded fluoropolymer extrudate to be stretched in the radial direction (e.g., to undergo radial expansion). Alternatively, in embodiments where the wetted expanded fluoropolymer extrudate is shaped like a sheet, step 110 can include wet stretching the wetted expanded fluoropolymer extrudate in the transverse direction (e.g., as opposed to the machine direction), as would be appreciated by one of skill in the art upon reading the present specification. For example, the wetted expanded fluoropolymer extrudate can be stretched in the transverse direction at a temperature below the flash point of the wet stretch wetting agent. U.S. Pat. No. 6,616,876, issued Sep. 9, 2003 and entitled "Method for treating expandable polymer materials," describes several examples of suitable wet stretch methods that additionally or alternatively can be used to perform step 110 in the method of FIG. 3. In general, any suitable step or method of wet stretching (also occasionally referred to within the art as "liquid expanding") the expanded fluoropolymer article may be used.

Notably, after performing step 110 of wet stretching the wetted expandable fluoropolymer extrudate to produce a wet expanded fluoropolymer article, the two portions of the resulting wet expanded fluoropolymer article can be placed in intimate contact with each other, i.e., while still wet with the wet-stretch wetting agent (step 112). Step 110 of placing the two portions in intimate contact with each other while the two portions (e.g., and optionally the entire wet expanded fluoropolymer article) are still wet with the wet-stretch wetting agent can be performed in a number of different ways. In accordance with the example embodiment of FIG. 1, the wet expanded fluoropolymer article produced in step 110 can be bent, folded, or curved in step 112 in such a way as to bring two end portions of the expanded fluoropolymer article into intimate contact with each other. The two end portions of the expanded fluoropolymer that are placed in intimate contact with each other can be partially or slightly overlapping. For example, the two end portions can be the portions 12 of the example embodiment of FIG. 1. In some embodiments, step 110 is performed by wrapping the wet stretched fluoropolymer article around a mandrel in such a way that the two end portions of the wet stretched fluoropolymer article are overlapping and in intimate contact.

In accordance with some alternative embodiments, the two end portions of the wet expanded fluoropolymer article instead are placed in intimate contact with each other in an abutting, side-by-side manner. Furthermore, although only small portions 12 of the wet expanded fluoropolymer article 10 of FIG. 1 have been placed in intimate contact, it should be appreciated that large portions of the wet expanded fluoropolymer article can be placed in intimate contact with itself. For example, a majority (i.e., greater than half) of the wet expanded fluoropolymer article can be placed in intimate contact with itself in step 112. In such embodiments wherein the wet expanded fluoropolymer article is shaped as a sheet, a first half of the wet expanded fluoropolymer article can be folded over and placed in intimate contact with a second half of the wet expanded fluoropolymer article. Upon reading the present specification, one of skill in the art will appreciate yet other ways to bring the two portions into intimate contact. All such alternatives and modifications are contemplated within the scope of the present invention.

While the two portions (e.g., the two end portions) are in intimate contact with each other, the wet-stretch wetting agent can be removed at least from the wet expanded fluoropolymer article (step 114). As two non-limiting examples, the wet-stretch wetting agent can be removed by exposing the wet expanded fluoropolymer article to drying conditions, e.g., involving application of heat. In step 114, the wet-stretch wetting agent optionally can also be removed from the remainder of the wet expanded fluoropolymer article besides just the two portions placed in intimate contact, e.g., by drying or heating all of the wet expanded fluoropolymer article. Furthermore, while still in intimate contact (e.g., and without being intermittently removed from intimate contact with each other), at least the two portions of the wet expanded fluoropolymer article can be sintered (step 116). In accordance with illustrative embodiments of the present invention, step 116 of sintering occurs at a temperature and for a period of time that is sufficient to form bonds between the two portions of the expanded fluoropolymer article. In general, step 116 can occur simultaneous with or subsequent to step 114 of removing the wet-stretch wetting agent. For example, steps 114 and 116 can include sintering the entire expanded fluoropolymer article for a period of time and at a temperature that is sufficient to both (a) cause the wet-stretch wetting agent to dry out and be removed from the expanded fluoropolymer article in its entirety and (b) cause bonds to form between the two portions of the expanded fluoropolymer article. The product resulting from step 116 is an expanded fluoropolymer article (e.g., 10, as depicted in FIG. 1) that is thermally bonded to itself without use of adhesive(s), optionally with the application of a joining force.

Figure 4:
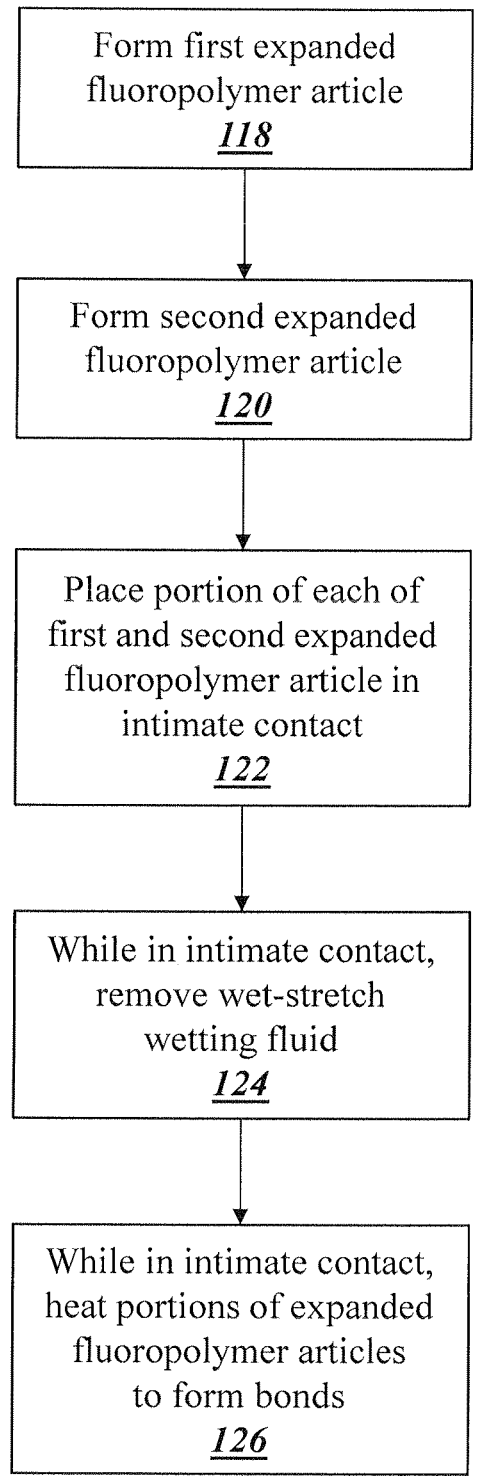
FIG. 4 is a flowchart of a method for making the expanded fluoropolymer article of any one of FIGS. 2A through 2C, according to an example embodiment of the present invention.

In accordance with an example embodiment of the present invention, FIG. 4 depicts a flow chart of a method for making a multi-layer or multi-portion fluoropolymer article, such as the fluoropolymer article 14, 18 of any one of FIGS. 2A through 2C. In general, a first expanded fluoropolymer article can be provided (step 118) and a second expanded fluoropolymer article can be provided (step 120). Each of the first and the second expanded fluoropolymer articles can be provided by stretching a wetted expandable fluoropolymer article. Accordingly, the first and the second expanded fluoropolymer articles that are provided can be wet, e.g., can still be wet with the wet-stretch wetting agent. Each of the first and the second expanded fluoropolymer articles provided in steps 118 and 120 can be produced by performing steps 102 through 110.

It should be appreciated that the first and the second expanded fluoropolymer articles provided in steps 118 and 120 can be wet-stretched using the same or different wet-stretch wetting agent(s). Furthermore, the first and second expanded fluoropolymer articles can be formed using the same or different lubricant wetting agent(s). In general, the first and second expanded fluoropolymer articles can be formed from the same mixture or from different mixtures (in step 102), from the same billet or from different billets (in step 104), and/or from the same or different expandable fluoropolymer extrudate(s) (in step 106). The present invention is not limited in the particular manner in which the first and second expanded fluoropolymer articles are provided in steps 118 and 120. Two entirely separate iterations of steps 102 through 108 can be performed using separate and/or different mixtures, billets, and/or expandable fluoropolymer extrudates, or a single iteration of steps 102 through 108 can be performed to provide the first and second expanded fluoropolymer articles.

A portion of the first expanded fluoropolymer article and a portion of the second expanded fluoropolymer article can be placed in intimate contact with each other while still wet with the wet-stretch wetting agent that used to wet stretch each of the first and second expanded fluoropolymer articles (step 122). Step 122 can occur in any number of suitable ways. As a first illustrative and non-limiting example, the portions of the first and second expanded fluoropolymer articles placed in intimate contact can form two fully-overlapping layers (e.g., tiers), as substantially depicted and described previously herein with reference to the multi-layer fluoropolymer article 16 of FIG. 2A, in which each of the fluoropolymer layers is a sheet. In such embodiments, an entirety of a face of the first expanded fluoropolymer article can be placed in intimate contact with an entirety of a face of the second expanded fluoropolymer article, as previously described herein. Alternatively, in some embodiments, the first and second expanded fluoropolymer articles are placed in intimate contact in such a way as to form a relatively thin or small overlapping portion. For example, only end portions of the first and second expanded fluoropolymer articles can be placed in intimate contact with each other. In such embodiments, the first and second expanded fluoropolymer articles can be substantially flat sheets that are not coplanar with one another (e.g., as depicted in FIG. 2B) or they can be substantially flat sheets that are coplanar with one another (e.g., as depicted in FIG. 2C). Alternatively, the first and second expanded fluoropolymer articles can be placed in intimate contact in such a way that an edge of the first expanded fluoropolymer article is abutting and contiguous with an edge of the second expanded fluoropolymer article.

While in intimate contact with each other, the wet-stretch wetting agent(s) used to produce the first and second expanded fluoropolymer articles can be removed at least from the portions of the first and second expanded fluoropolymer articles that are in intimate contact (step 124). The wet-stretch wetting agent(s) also may be simultaneously removed from a remainder of the first and second expanded fluoropolymer articles in step 124. As a non-limiting example, the wet-stretch wetting agent(s) can be removed by drying the portions of the first and second expanded fluoropolymer articles in intimate contact, e.g., by applying heat to at least the portions of the first and second expanded fluoropolymer articles in intimate contact.

Furthermore, while still in intimate contact (e.g., and without being intermittently removed from intimate contact with each other), at least the portions of the first and second expanded fluoropolymer articles can be sintered (step 126). "Sintering," as used herein, has its normal definition in the art of causing to become a coherent mass by heating without melting. Accordingly, in step 126 of sintering, bonds are formed between the portions of the first and second expanded fluoropolymer articles. Without wishing to be bound by any particular theory, it is believed that the bonds formed comprise a combination of bonds. The combination of bonds can include, but is not limited to, one or more of covalent bonds, van der Walls forces, hydrogen bonds, ionic bonds, electrostatic interactions and/or changes created in the chain entanglement of the expanded fluoropolymer material. In certain embodiments, the combination of bonds comprises covalent bonds. In certain embodiments, the combination of bonds comprises van der Walls forces. In certain embodiments, the combination of bonds comprises hydrogen bonds. In certain embodiments, the combination of bonds comprises ionic bonds. In certain embodiments, the combination of bonds comprises electrostatic interactions. In certain embodiments, the combination of bonds comprises changes created in the chain entanglement of the expanded fluoropolymer material.

In certain embodiments, the combination of bonds comprises covalent bonds and at least one other type bond. In an embodiment, the combination of bonds comprises at least covalent bonds and van der Walls forces. In an embodiment, the combination of bonds comprises at least covalent bonds and hydrogen bonds. In an embodiment, the combination of bonds comprises at least covalent bonds and ionic bonds. In an embodiment, the combination of bonds comprises at least covalent bonds and electrostatic interactions. In an embodiment, the combination of bonds comprises at least covalent bonds and changes created in the chain entanglement of the expanded fluoropolymer material.

In certain embodiments, the combination of bonds comprises covalent bonds and at least two other types of bonds. In an embodiment, the combination of bonds comprises at least covalent bonds, van der Walls forces and hydrogen bonds. In an embodiment, the combination of bonds comprises at least covalent bonds, van der Walls forces and ionic bonds. In an embodiment, the combination of bonds comprises at least covalent bonds, van der Walls forces and electrostatic interactions. In an embodiment, the combination of bonds comprises at least covalent bonds, van der Walls forces and electrostatic interactions. In an embodiment, the combination of bonds comprises at least covalent bonds, van der Walls forces and changes in the chain entanglement of the expanded fluoropolymer material. In an embodiment, the combination of bonds comprises at least covalent bonds, hydrogen bonds and ionic bonds. In an embodiment, the combination of bonds comprises at least covalent bonds, hydrogen bonds and electrostatic interactions. In an embodiment, the combination of bonds comprises at least covalent bonds, hydrogen bonds and changes in the chain entanglement of the expanded fluoropolymer material. In an embodiment, the combination of bonds comprises at least covalent bonds, ionic bonds, and electrostatic interactions. In an embodiment, the combination of bonds comprises at least covalent bonds, ionic bonds, and changes in the chain entanglement of the expanded fluoropolymer material. In an embodiment, the combination of bonds comprises at least covalent bonds, electrostatic interactions, and changes in the chain entanglement of the expanded fluoropolymer material.

In an embodiment, the combination of bonds comprises covalent bonds and at least three other types of bonds. In an embodiment, the combination of bonds comprises at least covalent bonds, van der Walls forces, hydrogen bonds and ionic bonds. In an embodiment, the combination of bonds comprises at least covalent bonds, van der Walls forces, hydrogen bonds and electrostatic interactions. In an embodiment, the combination of bonds comprises at least covalent bonds, van der Walls forces, hydrogen bonds and changes in the chain entanglement of the expanded fluoropolymer material. In an embodiment, the combination of bonds comprises at least covalent bonds, van der Walls forces, ionic bonds, and electrostatic interactions. In an embodiment, the combination of bonds comprises at least covalent bonds, van der Walls forces, ionic bonds and changes in the chain entanglement of the expanded fluoropolymer material. In an embodiment, the combination of bonds comprises at least covalent bonds, van der Walls forces, electrostatic interactions, and changes in the chain entanglement of the expanded fluoropolymer material. In an embodiment, the combination of bonds comprises at least covalent bonds, hydrogen bonds, ionic bonds and electrostatic interactions. In an embodiment, the combination of bonds comprises at least covalent bonds, hydrogen bonds, ionic bonds and changes in the chain entanglement of the expanded fluoropolymer material. In an embodiment, the combination of bonds comprises at least covalent bonds, ionic bonds, electrostatic interactions and changes in the chain entanglement of the fluoropolymer material.

In certain embodiments, the combination of bonds comprises covalent bonds and at least four other types of bonds. In an embodiment, the combination of bonds comprises at least covalent bonds, van der Walls forces, hydrogen bonds, ionic bonds and electrostatic interactions. In an embodiment, the combination of bonds comprises at least covalent bonds, van der Walls forces, hydrogen bonds, ionic bonds and changes in the chain entanglement of the expanded fluoropolymer material. In an embodiment, the combination of bonds comprises at least covalent bonds, hydrogen bonds, ionic bonds, electrostatic interactions, and changes in the chain entanglement of the expanded fluoropolymer material.

In an embodiment, the combination of bonds comprises covalent bonds and at least five other types of bonds. In an embodiment, the combination of bonds comprises at least covalent bonds, van der Walls forces, hydrogen bonds, ionic bonds, electrostatic interactions, and changes in the chain entanglement of the expanded fluoropolymer material.

In certain embodiments, the combination of bonds does not comprise covalent bonds.

In certain embodiments, the combination of bonds comprises van der Walls forces and at least one other type of bond. In an embodiment, the combination of bonds comprises at least van der Walls forces and hydrogen bonds. In an embodiment, the combination of bonds comprises at least van der Walls forces and ionic bonds. In an embodiment, the combination of bonds comprises at least van der Walls forces and electrostatic interactions. In an embodiment, the combination of bonds comprises at least van der Walls forces and changes in the chain entanglement of the expanded fluoropolymer material. In an embodiment, the combination of bonds comprises at least van der Walls forces and covalent bonds.

In certain embodiments, the combination of bonds comprises van der Walls forces and at least two other types of bonds. In an embodiment, the combination of bonds comprises at least van der Walls forces, hydrogen bonds and ionic bonds. In an embodiment, the combination of bonds comprises at least van der Walls forces, hydrogen bonds and electrostatic interactions. In an embodiment, the combination of bonds comprises at least van der Walls forces, hydrogen bonds and changes in the chain entanglement of the expanded fluoropolymer material. In an embodiment, the combination of bonds comprises at least van der Walls forces, hydrogen bonds and covalent bonds. In an embodiment, the combination of bonds comprises at least van der Walls forces, ionic bonds and electrostatic interactions. In an embodiment, the combination of bonds comprises at least van der Walls forces, ionic bonds and changes in the chain entanglement of the expanded fluoropolymer material. In an embodiment, the combination of bonds comprises at least van der Walls forces, ionic bonds and covalent bonds. In an embodiment, the combination of bonds comprises at least van der Walls forces, electrostatic interactions and changes in the chain entanglement of the expanded fluoropolymer material. In an embodiment, the combination of bonds comprises at least van der Walls forces, electrostatic interactions and covalent bonds. In an embodiment, the combination of bonds comprises at least van der Walls forces, changes in the chain entanglement of the expanded fluoropolymer material and covalent bonds.

In certain embodiments, the combination of bonds comprises van der Walls forces and at least three other types of bonds. In an embodiment, the combination of bonds comprises at least van der Walls forces, hydrogen bonds, ionic bonds, and electrostatic interactions. In certain embodiments, the combination of bonds comprises at least van der Walls forces, hydrogen bonds, electrostatic interactions and changes in the chain entanglement of the expanded fluoropolymer material. In certain embodiments, the combination of bonds comprises van der Walls forces, hydrogen bonds, electrostatic interactions and covalent bonds. In certain embodiments, the combination of bonds comprises at least van der Walls forces, ionic bonds, electrostatic interactions and changes in the chain entanglement of the expanded fluoropolymer material. In certain embodiments, the combination of bonds comprises at least van der Walls forces, ionic bonds, electrostatic interactions and covalent bonds. In certain embodiments, the combination of bonds comprises at least van der Walls forces, ionic bonds, electrostatic interactions and covalent bonds. In certain embodiments, the combination of bonds comprises at least van der Walls forces, electrostatic interactions, changes in the chain entanglement of the expanded fluoropolymer material and covalent bonds.

In certain embodiments, the combination of bonds comprises van der Walls forces and at least four other types of bonds. In an embodiment, the combination of bonds comprises at least Van der walls forces, hydrogen bonds, ionic bonds, electrostatic interactions and changes in the chain entanglement of the expanded fluoropolymer material.

In certain embodiments, the combination of bonds does not comprise van der Walls forces.

In certain embodiments, the combination of bonds comprises changes in the chain entanglement of the expanded fluoropolymer material and at least one other type of bond. In an embodiment, the combination of bonds comprises at least changes in the chain entanglement of the expanded fluoropolymer material and covalent bonds. In an embodiment, the combination of bonds comprises at least changes in the chain entanglement of the expanded fluoropolymer material and van der Walls forces. In an embodiment, the combination of bonds comprises at least changes in the chain entanglement of the expanded fluoropolymer material and hydrogen bonds. In an embodiment, the combination of bonds comprises at least changes in the chain entanglement of the expanded fluoropolymer material and ionic bonds. In an embodiment, the combination of bonds comprises at least changes in the chain entanglement of the expanded fluoropolymer material and electrostatic interactions.

In certain embodiments, the combination of bonds comprises changes in the chain entanglement of the expanded fluoropolymer material and at least two other types of bonds. In an embodiment, the combination of bonds comprises at least changes in the chain entanglement of the expanded fluoropolymer material, covalent bonds and van der Walls forces. In an embodiment, the combination of bonds comprises at least changes in the chain entanglement of the expanded fluoropolymer material, covalent bonds and hydrogen bonds. In an embodiment, the combination of bonds comprises at least changes in the chain entanglement of the expanded fluoropolymer material, covalent bonds and ionic bonds. In an embodiment, the combination of bonds comprises at least changes in the chain entanglement of the expanded fluoropolymer material, covalent bonds and electrostatic interactions. In an embodiment, the combination of bonds comprises at least changes in the chain entanglement of the expanded fluoropolymer material, van der Walls forces and hydrogen bonds. In an embodiment, the combination of bonds comprises at least changes in the chain entanglement of the expanded fluoropolymer material, van der Walls forces and ionic bonds. In an embodiment, the combination of bonds comprises at least changes in the chain entanglement of the expanded fluoropolymer material, van der Walls forces and electrostatic interactions. In an embodiment, the combination of bonds comprises at least changes in the chain entanglement of the expanded fluoropolymer material, hydrogen bonds, and ionic bonds. In an embodiment, the combination of bonds comprises at least changes in the chain entanglement of the expanded fluoropolymer material, hydrogen bonds, and electrostatic interactions. In an embodiment, the combination of bonds comprises at least changes in the chain entanglement of the expanded fluoropolymer material, ionic bonds and electrostatic interactions.

In certain embodiments, the combination of bonds comprises changes in the chain entanglement of the expanded fluoropolymer material and at least three other types of bonds. In an embodiment, the combination of bonds comprises at least changes in the chain entanglement of the expanded fluoropolymer material, covalent bonds, van der Walls forces and hydrogen bonds. In an embodiment, the combination of bonds comprises at least changes in the chain entanglement of the expanded fluoropolymer material, covalent bonds, van der Walls forces and ionic bonds. In an embodiment, the combination of bonds comprises at least changes in the chain entanglement of the expanded fluoropolymer material, covalent bonds, van der Walls forces and electrostatic interactions. In an embodiment, the combination of bonds comprises at least changes in the chain entanglement of the expanded fluoropolymer material, van der Walls forces, hydrogen bonds, and ionic bonds. In an embodiment, the combination of bonds comprises at least changes in the chain entanglement of the expanded fluoropolymer material, van der Walls forces, hydrogen bonds, and electrostatic interactions. In an embodiment, the combination of bonds comprises at least changes in the chain entanglement of the expanded fluoropolymer material, hydrogen bonds, ionic bonds and electrostatic interactions.

In certain embodiments, the combination of bonds comprises changes in the chain entanglement of the expanded fluoropolymer material and at least four other types of bonds.

In certain embodiments, the combination of bonds does not comprise the chain entanglement of the expanded fluoropolymer material.

In certain embodiments, the combination of bonds comprises hydrogen bonds and at least one other bond type. In an embodiment, the combination of bonds comprises at least hydrogen bonds and ionic bonds. In an embodiment, the combination of bonds comprises at least hydrogen bonds and electrostatic interactions.

In certain embodiments, the combination of bonds comprises hydrogen bonds and at least two other bond types. In an embodiment, the combination of bonds comprises at least hydrogen bonds, ionic bonds and electrostatic interactions.

In certain embodiments, the combination of bonds comprises hydrogen bonds and at least two three other bond types.

In certain embodiments, the combination of bonds comprises hydrogen bonds and at least two four other bond types.

In certain embodiments, the combination of bonds does not comprise hydrogen bonds.

In certain embodiments, the combination of bonds comprises ionic bonds and at least one other bond type. In an embodiment, the combination of bonds comprises at least ionic bonds and electrostatic interactions.

In certain embodiments, the combination of bonds comprises ionic bonds and at least two other bond types.

In certain embodiments, the combination of bonds comprises ionic bonds and at least three other bond types.

In certain embodiments, the combination of bonds comprises ionic bonds and at least four other bond types.

In certain embodiments, the combination of bonds does not comprise ionic bonds.

In general, step 126 can occur simultaneous with or subsequent to step 124 of removing the wet-stretch wetting agent(s). For example, steps 124 and 126 can include sintering all of the first and the second expanded fluoropolymer articles for a period of time and at a temperature that is sufficient to both (a) cause the wet-stretch wetting agent(s) to dry out and be removed from both the first and the second expanded fluoropolymer article in their entirety and (b) cause bonds to form between the portions of the first and second expanded fluoropolymer article in intimate contact. The end result of step 126 is an expanded fluoropolymer article having multiple layers or portions that are thermally bonded to each other without the use of adhesive(s) (optionally applying a joining force).

In general, although the extrusion wetting agent and the wet-stretch wetting agent are referred to herein in the singular, it should be appreciated that each such wetting agent can include a blend or other combination of different wetting agents. Accordingly, the effects and functionality described herein with reference to any single wetting agent can be achieved in each instance through the use of a plurality of wetting agents. Furthermore, the extrusion wetting agent and the wet-stretch wetting agent can be the same or different wetting agents. As a few non-limiting examples, each of the extrusion wetting agent and the wet-stretch wetting agent can include ethanol, methanol, IPA, Isopar-H, Isopar-E, Isopar-V, or any combination thereof. Upon reading the present specification, one of skill in the art will appreciate a variety of additional wetting agents that of which the wet-stretch wetting agent and/or the extrusion agent can be comprised. The present invention is not limited to the particular examples of wetting agents described herein. Any suitable wetting agent may be implemented with the present invention.

During the course of work described herein, the performance of expanded fluoropolymers processed according to the methods of the present invention were analyzed in comparison to fluoropolymers processed according to conventional methods. The results of such performance tests indicate that the expanded fluoropolymers (e.g., PTFE) processed according to the methods of the present invention outlined herein possess many characteristics and properties that are unexpected and superior compared to conventional fluoropolymers, such as perfluoroalkoxy (PFA) and expanded polytetrafluoroethylene (ePTFE). It was surprisingly and unexpectedly observed, for example, that the expanded fluoropolymers of the present invention possess the ability to be thermally bonded (e.g., joined, sealed or laminated) together without the aid of an adhesive, lamination aid, or chemical or physical treatment, such as chemical etching, plasma treatment or corona treatment. It was additionally observed that the expanded fluoropolymers of the present invention are capable of being thermally bonded together without application of a crushing force (e.g., by optionally applying a joining force). It was surprisingly and unexpectedly observed, for example, that the strength of the bonds at the interface between the expanded fluoropolymers of the present invention that are thermally bonded together is greater than the strength of the expanded fluoropolymers themselves.

These superior and unexpected properties are believed to be the result of the inventive processing methods outlined herein in which it was further unexpectedly and surprisingly discovered that, in contrast to conventional processing methods in which portions of the fluoropolymer are placed in intimate contact at the beginning of the process and require at least some stretching after being placed in intimate contact, the methods of the present invention place portions of the fluoropolymer in intimate contact further downstream in the process (i.e., after wet stretching) and no further stretching is required after a wetting agent is removed to produce the superior results obtained herein.

Conventional wisdom holds that placing the portions in intimate contact in the beginning of the process (e.g., before at least some stretching) is preferable because it maximizes contacts between fluoropolymer materials being bonded together and promotes a uniform microstructure across the interface between the fluoropolymers upon subsequent stretching to impart bond strength. Contrary to conventional wisdom, it has been unexpectedly and surprisingly observed that (a) placing portions of the wet-stretched fluoropolymer in intimate contact after stretching, (b) removing the wetting agent from the wet-stretched fluoropolymer while those portions are in intimate contact with each other, and (c) heating (e.g., sintering) collectively enable the expanded fluoropolymer to achieve a stronger material strength. Furthermore, stronger bonds are formed between those portions in intimate contact, and the improved bond strength is greater than the strength of the expanded fluoropolymer material itself.

In further contrast to conventional processing methods which produce porous PTFE, the methods of the present invention yield a substantially non-porous fluoropolymer, e.g., non-porous ePTFE, i.e., non-porous wet-stretched ePTFE. Those conventional processes typically employ a filler (e.g., of up to 50% by weight) to fill the pores and enhance the density of the final product. In contrast to conventional processes, upon completion of the methods of the present invention, and in particular upon placing portions of fluoropolymers in intimate contact after stretching, and removing the wetting agent while the wet-stretched fluoropolymer is in intimate contact with itself or another wet-stretched fluoropolymer, the expanded fluoropolymers thus formed are substantially non-porous without further processing or addition of filler.

Without being bound or limited by theory, it is believed that placing the portions of fluoropolymer to be thermally bonded together after stretching maximizes the density and decreases the porosity of the material without diminishing the contacts between the fluoropolymers, thereby increasing both the number and strength of the bonds formed in each direction. It is also believed that performing at least some stretching after removing the wetting agent from a wet-stretched fluoropolymer material while portions of the wet-stretched fluoropolymer material remain in intimate contact with each other can result in sub-optimal overall bond strength at the interface between the thermally bonded portions due to the incidental breaking of individual bonds and accompanying increased porosity achieved during the subsequent stretching.

These unexpected and superior results will be apparent to one of skill upon reviewing the results of the performance testing, which are summarized below.

Longitudinal Tensile Strength (ASM D882)

Figure 5A:
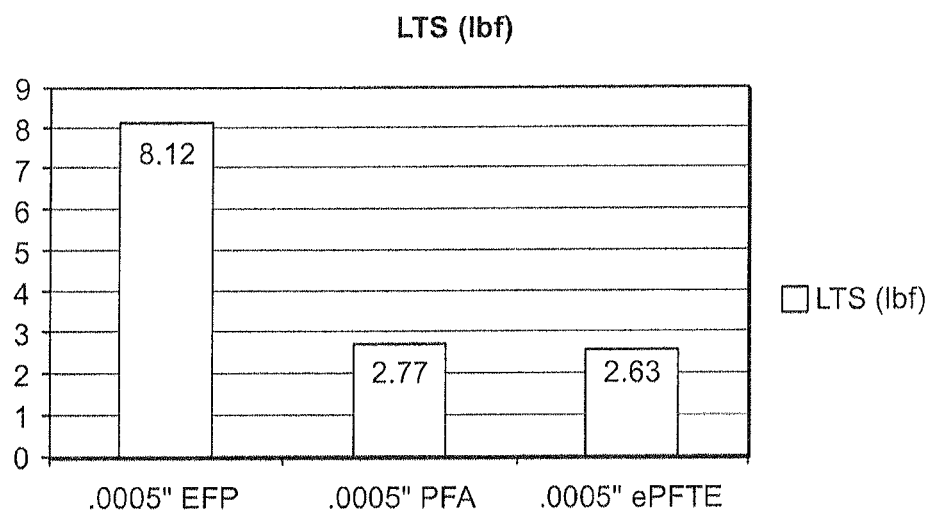
FIG. 5A is a bar graph comparing the longitudinal tensile strength (lbf) of a fluoropolymer article according to one aspect of the present invention to the longitudinal tensile strength (lbf of similarly constructed articles made from perfluoroalkoxy (PFA) and ePTFE.
Figure 5B:
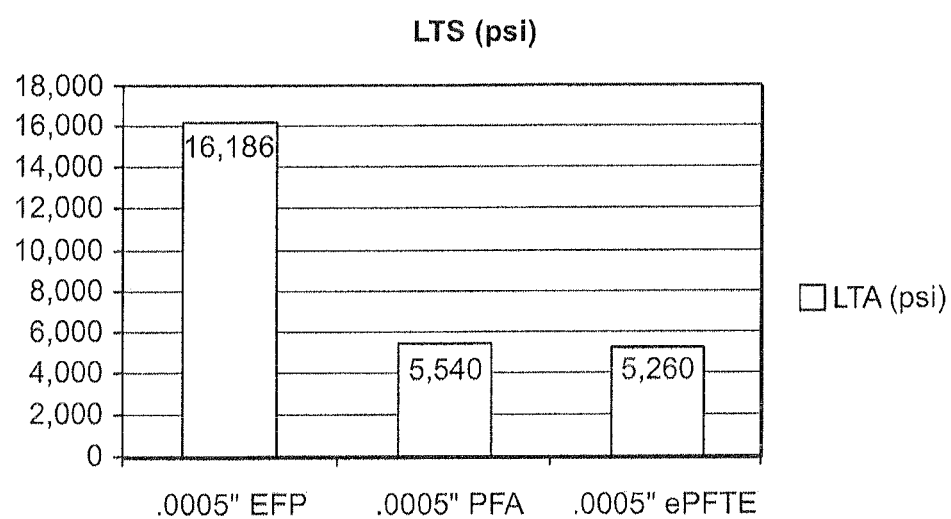
FIG. 5B is a bar graph comparing the longitudinal tensile strength (psi) of a fluoropolymer article produced according to one aspect of the present invention to the longitudinal tensile strength (psi) of similarly constructed articles made from PFA and ePTFE.

The longitudinal tensile strength of articles constructed from expanded fluoropolymers of the present invention was tested and compared to the longitudinal tensile strength of similarly constructed articles made using PFA and conventional ePTFE (e.g., via known processes of lubricating PTFE resin, preforming, extruding, calendaring, removing lubrication, and stretching in the machine direction). The PFA articles tested were produced using PFA material commercially available as a cast film from CS Hyde Company, Inc, of Lake Villa, Ill. (skived PFA film). The longitudinal tensile strength was measured using an INSTRONO universal testing machine, in accordance with ASTM D882, entitled "Standard Test Method for Tensile Properties of Thin Plastic Sheeting." Tubes of expanded fluoropolymer of the present invention were cut open along the length at the joint to form 1"×2" articles of expanded fluoropolymer having thicknesses of 0.0005 inch. The fluoropolymer articles thus formed were loaded into the testing machine with a 1" gap between the grips. As shown in FIGS. 5A and 5B, in certain illustrative embodiments, a fluoropolymer article has a longitudinal tensile strength at break of at least 8.12 lbf (16,186 psi) on a 0.0005 inch thick sheet as measured according to ASTM D882. The ePTFE articles tested were produced according to conventional methods (e.g., via known processes of lubricating PTFE resin, preforming, extruding, calendaring, removing lubrication, and stretching in the machine direction). Six samples of each of the expanded fluoropolymer, PFA, and ePTFE articles were measured. The average results obtained measuring these samples are shown in Table 1 below. As is shown in Table 1, the articles made from the expanded fluoropolymers of the present invention have a longitudinal tensile strength that is significantly greater than the PFA material or the ePTFE material.

TABLE 1

| Longitudinal Tensile Strength (LTS) | | |
|---|---|---|
| | LTS (lbf) | LTS (psi) |
| 0.0005" EFP | 8.12 | 16,186 |
| 0.0005" PFA | 2.77 | 5,540 |
| 0.0005" ePTFE | 2.63 | 5.260 |

Figure 6:
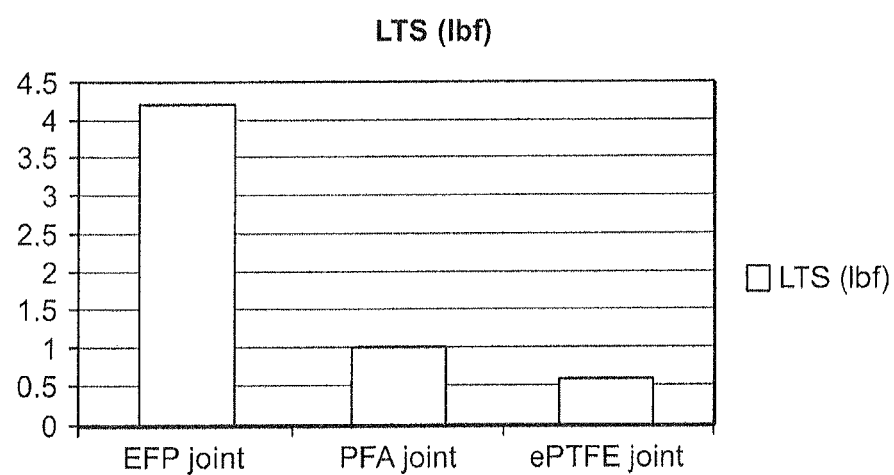
FIG. 6 is a bar graph comparing the longitudinal tensile strength (lbf) at the joint of a fluoropolymer article produced according to one aspect of the present invention to the longitudinal tensile strength (lbf) at the joints of similarly constructed articles made from PFA and ePTFE.

Bond Strength (ASM D882) of Expanded Fluoropolymer Thermally Bonded to Itself without Adhesive The bond strength of expanded fluoropolymer thermally bonded to itself (forming the joint) without adhesive according to the methods of the present invention was tested and compared to the bond strength of similarly constructed articles made using PFA and ePTFE by conventional methods. The bond strength was measured using an INSTRON® universal testing machine, in accordance with ASTM D882, entitled "Standard Test Method for Tensile Properties of Thin Plastic Sheeting." The opposing edges of an expanded fluoropolymer were thermally bonded to each other (forming a joint) according to the methods of the present invention to form expanded fluoropolymer tubes. For example, a sheet comprising expanded fluoropolymers of the present invention was wrapped around a mandrel length wise with a 0.25 inch overlap to form a joined configuration. The material was subsequently heated to 360° Celsius for approximately 15 minutes. The tubes of expanded fluoropolymer of the present invention were cut along the length opposite of the bonds (joint) to form articles having a 1-inch width and the bonds in the middle. Articles were loaded onto the testing machine with the bonds between the grips. Surprisingly and unexpectedly, all of the articles constructed from the expanded fluoropolymers thermally bonded to themselves without adhesive according to the methods of the present invention failed outside the bonded portions (i.e., outside the joint), in contrast to the PFA and ePTFE articles made using conventional methods, which all failed at or within the bonded portions (i.e., at or within the joint). This result indicates that the bond strength in the X-direction of the expanded fluoropolymers thermally bonded to themselves without adhesive is greater than the X direction strength of the expanded fluoropolymers themselves. Put differently, the strength at the joint of the expanded fluoropolymer article thermally bonded to itself without adhesive in a joined configuration is greater than the strength of the fluoropolymer article itself. As shown in FIG. 6, in certain illustrative embodiments, an expanded fluoropolymer article thermally bonded to itself has a bond strength at failure, when formed as a sheet having a thickness of 0.0005 inches, of 4.2 lbf (8,400 psi) as measured according to ASTM D882. Table 2 below shows the results of the bond strength testing. As is shown in Table 2, the bond strength of the expanded fluoropolymer articles thermally bonded to themselves without adhesive according to the methods of the present invention is about 4 fold greater than the bond strength of the PFA articles, and about 8 fold greater than the bond strength of the ePTFE articles constructed using conventional methods.

TABLE 2

| X-Direction Tensile Strength or Joint Strength | | |
|---|---|---|
| | LTS (lbf) | LTS (psi) |
| EFP joint | 4.2 | 8,400 |
| PFA joint | 1.01 | 2,020 |
| ePTFE joint | 0.59 | 1,180 |

Radial Tensile Strength (RTS)

Figure 7A:
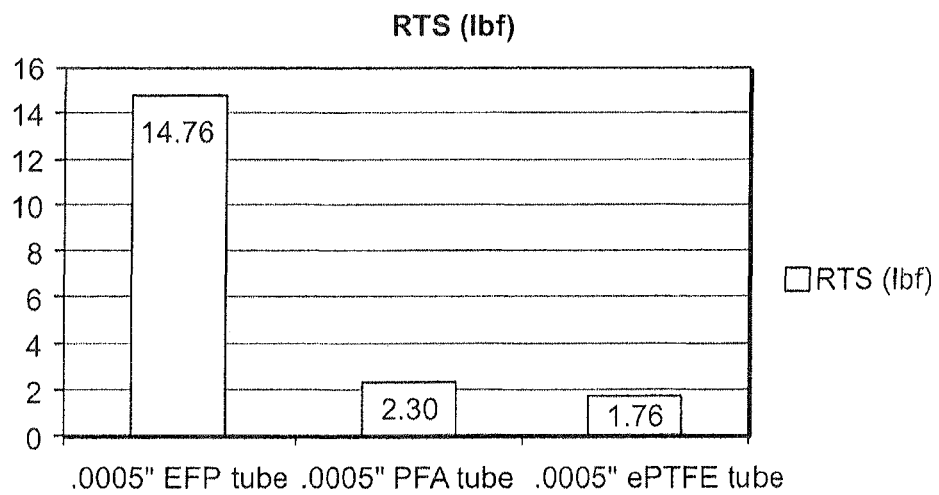
FIG. 7A is a bar graph comparing the radial tensile strength (lbf) of a fluoropolymer article produced according to one aspect of the present invention to the radial tensile strength (lbf) of similarly constructed articles made from PFA and ePTFE.
Figure 7B:
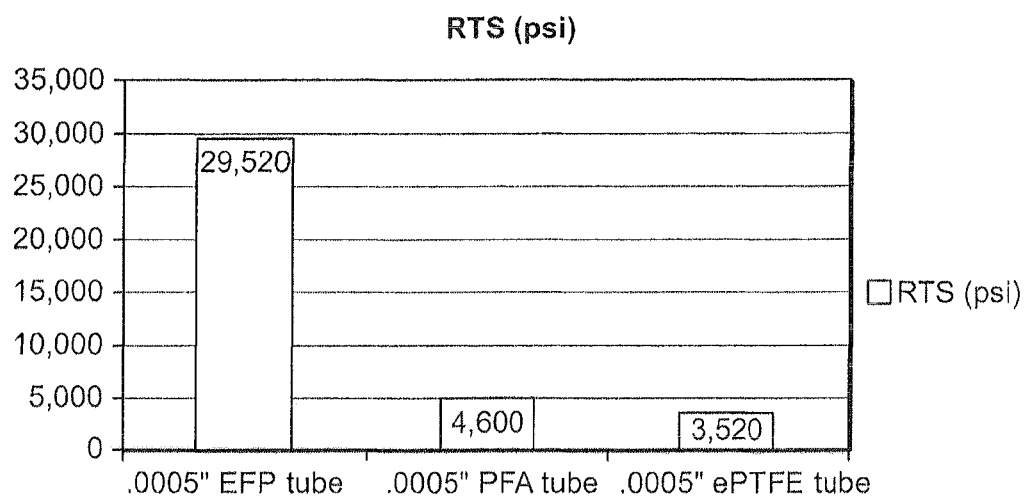
FIG. 7B is a bar graph comparing the radial tensile strength (psi) of a fluoropolymer article produced according to one aspect of the present invention to the radial tensile strength (psi) of similarly constructed articles made from PFA and ePTFE.

The radial tensile strength of articles constructed from expanded fluoropolymers thermally bonded to themselves without adhesive according to the methods the present invention was tested and compared to the radial tensile strength of similarly constructed articles made using PFA and conventional ePTFE by conventional methods. The radial tensile strength was measured using an INSTRON® universal testing machine, in accordance with ASTM D882, entitled "Standard Test Method for Tensile Properties of Thin Plastic Sheeting." The articles tested were constructed in the form of 1" diameter tubes into which a split mandrel was inserted about 1" into the length of each tube after which each half of the mandrel was pulled in opposite directions until each tube failed. As shown in FIGS. 7A and 7B, in certain illustrative embodiments, an expanded fluoropolymer article thermally bonded to itself has a radial tensile strength, when formed as a 1" diameter tube having a thickness of 0.0005 inches, of 14.76 lbf (29,520 psi) as measured according to ASTM D882. Table 3 below shows the results of the radial tensile strength tests. The result reported in Table 3 below was the highest value recorded for each of the articles.

TABLE 3

Radial Tensile Strength

|  | RTS (lbf) | RTS (psi) |
|---|---|---|
| .0005" EFP tube | 14.76 | 29,520 |
| .0005" PFA tube | 2.30 | 4,600 |
| .0005" ePTFE tube | 1.76 | 3,520 |

Longitudinal Tensile Strength of Perforated Expanded Fluoropolymer Films

The longitudinal tensile strength of perforated films constructed from expanded fluoropolymers produced according to the methods the present invention was tested and compared to the longitudinal tensile strength of similarly constructed perforated articles made using PFA and conventional ePTFE by conventional methods. Perforations of approximately 100 microns were made in each of the films using a laser. Samples were made with different perforation densities and then tested for longitudinal tensile strength as described above using an INSTRON® universal testing machine. The results are shown in Tables 4, 5 and 6 below.

TABLE 4

Longitudinal Tensile Strength of Perforated Expanded Fluoropolymers of the present invention

|  | LTS (lbf) | LTS (psi) | Elongation (in) | Elongation (%) |
|---|---|---|---|---|
| .0005" EFP | 8.12 | 16,240 | 3.45 | 345% |
| .0005" EFP perforated 900 perforations (100 micron) in² | 5.73 | 11,452 | 1.16 | 116% |
| .0005" EFP perforated 1,600 (100 micron) in² | 4.4 | 8,816 | 1.06 | 106% |
| .0005" EFP perforated 2,500 (100 micron) in² | 2.53 | 5,066 | 0.61 | 61% |

TABLE 5

Longitudinal Tensile Strength of Perforated PFA

|  | LTS (lbf) | LTS (psi) | Elongation (in) | Elongation (%) |
|---|---|---|---|---|
| .0005" PFA | 2.77 | 5,540 | 2.38 | 238% |
| .0005" PFA perforated 900 (100 micron) in² | 1.14 | 2,280 | 1.0 | 100% |
| .0005" PFA perforated 1600 (100 micron) in² | 1.05 | 2,100 | 0.96 | 96% |
| .0005" PFA perforated 2500 (100 micron) in² | 0.85 | 1,700 | 0.77 | 77% |

TABLE 6

Longitudinal Tensile Strength of Perforated ePTFE

|  | LTS (lbf) | LTS (psi) | Elongation (in) | Elongation (%) |
|---|---|---|---|---|
| .0005" ePTFE | 2.63 | 5,260 | 0.5 | 50% |
| .0005" ePTFE perforated 900 (100 micron) in² | 1.01 | 2,020 | 0.33 | 33% |
| .0005" ePTFE perforated 1600 (100 micron) in² | 0.94 | 1,880 | 0.28 | 28% |
| .0005" ePTFE perporated 2500 (100 micron) in² | 0.17 | 340 | 0.21 | 21% |

Figure 8:
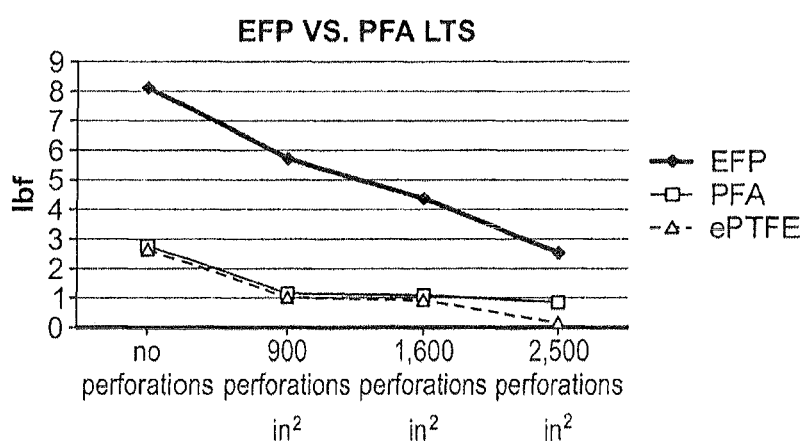
FIG. 8 is a line graph comparing the longitudinal tensile strength (lbf) of increasingly perforated fluoropolymer articles produced according to one aspect of the present invention to the longitudinal tensile strength (psi) of similarly constructed perforated articles made from PFA and ePTFE.

In accordance with an illustrative and non-limiting example embodiment of the present invention, an expanded fluoropolymer article has a longitudinal tensile strength, when formed as a 0.0005 inch thick film having about 900 perforations per square inch of approximately 100 microns, of 5.73 lbf (11,452 psi), as measured according to ASTM D882. In accordance with an illustrative and non-limiting example embodiment of the present invention, an expanded fluoropolymer article has a longitudinal tensile strength, when formed as a 0.0005 inch thick film having about 1,600 perforations per square inch of approximately 100 microns, of 4.4 lbf (8,816 psi), as measured according to ASTM D882. In accordance with an illustrative and non-limiting example embodiment of the present invention, an expanded fluoropolymer article has a longitudinal tensile strength, when formed as a 0.0005 inch thick film having about 2,500 perforations per square inch of approximately 100 microns, of 2.53 lbf (5,066 psi), as measured according to ASTM D882. As shown in FIG. 8, the longitudinal tensile strength of the perforated expanded fluoropolymers produced according to the methods of the present invention is significantly greater than the longitudinal tensile strength of the perforated PFA and ePTFE regardless of the amount of perforations.

Contact Angle

Figure 9A:
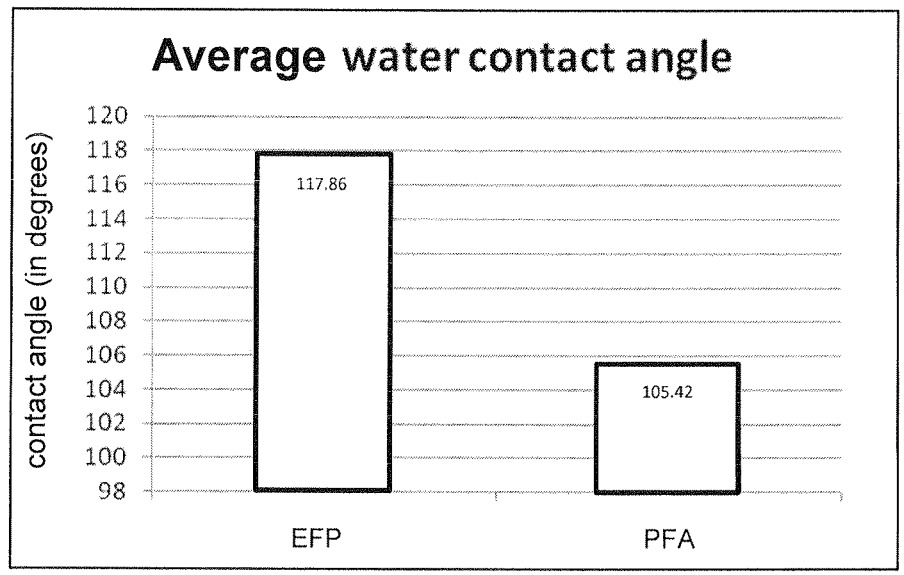
FIG. 9A is a bar graph comparing the average water contact angles of various fluoropolymer articles produced according to one aspect of the present invention to the average water contact angles of a similarly constructed articles made from PFA.
Figure 9B:
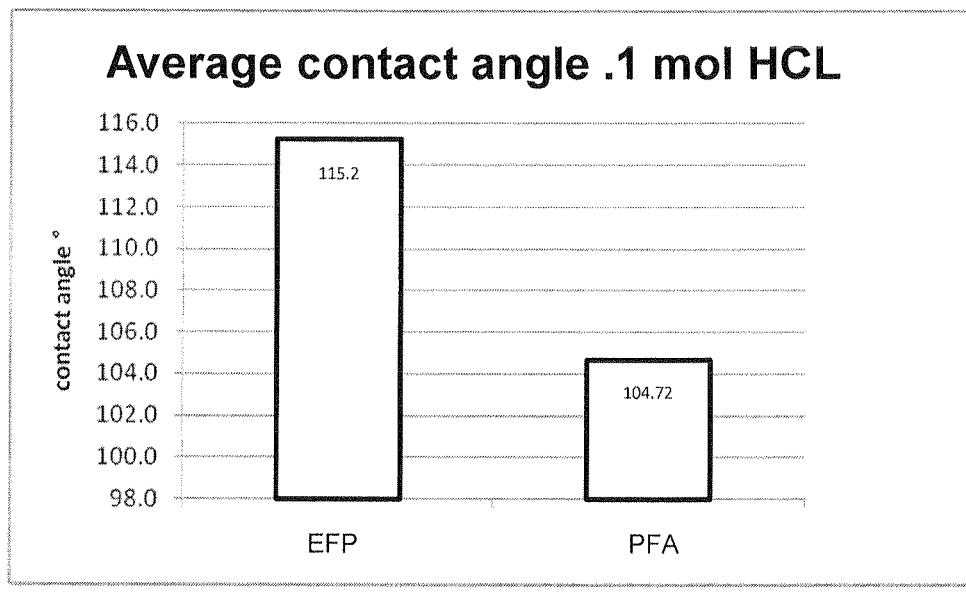
FIG. 9B is a bar graph comparing the average 0.1 mol HCL contact angles of various fluoropolymer articles produced according to one aspect of the present invention to the average 0.1 mol HCL contact angles of a similarly constructed articles made from PFA.
Figure 10:
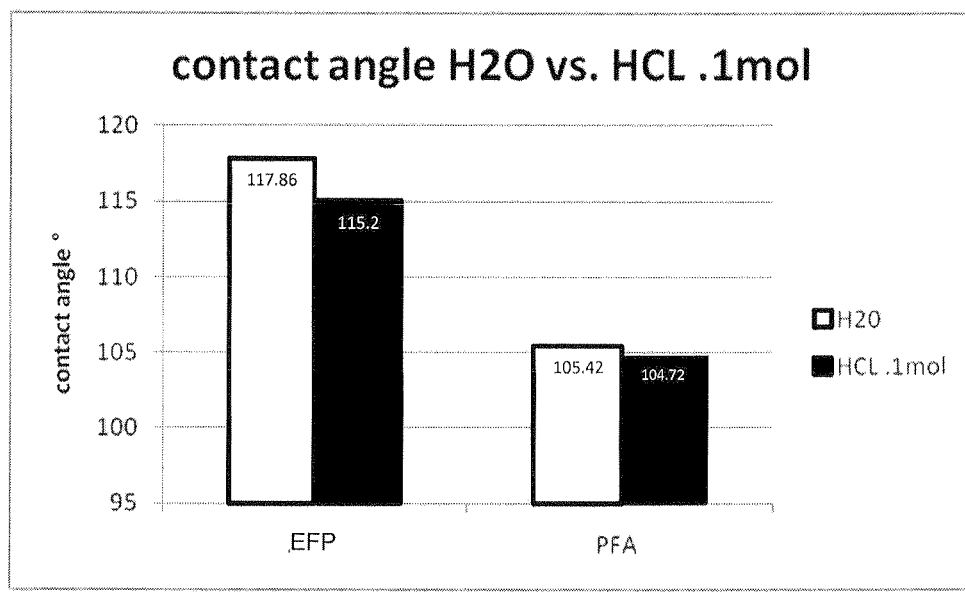
FIG. 10 is a bar graph comparing the average water and 0.1 mol HCL contact angles of various fluoropolymer articles produced according to one aspect of the present invention to the average water and 0.1 mol HCL contact angles of similarly constructed articles made from PFA.

The contact angle of the expanded fluoropolymers produced according to the methods of the present invention was measured using water and 0.1 mol hydrochloric acid as the test fluids and compared to the contact angle of PFA measured using the same test fluids. All measurements were taken using an AST video contact angle system. The static sessile drop method was utilized. The sessile drop method uses a contact angle goniometer with an optical subsystem to capture the profile of a liquid on a solid substrate. The angle formed between the liquid/solid interface and the liquid/vapor interface is the contact angle. The results of the water contact angle and acid contact angle measurements are provided in Tables 7 and 8 below, respectively. FIG. 9 shows the average results of the water (FIG. 9A) and acid (FIG. 9B) contact angles for the expanded fluoropolymers produced according to the methods of the present invention compared to the water and acid contact angles for PFA. FIG. 10 shows a side-by-side comparison of the combined results depicted in FIGS. 9A and 9B for water and acid contact angles for both the expanded fluoropolymers of the present invention and PFA.

TABLE 7

Water contact angle

| | EFPs | PFA |
|---|---|---|
| angle ° | 117.4 | 104.5 |
| | 115.8 | 104.8 |
| | 121.2 | 106.4 |
| | 116.4 | 104.7 |
| | 118.5 | 106.7 |
| average | 117.86 | 105.42 |

TABLE 8

1 mol hydrochloric acid contact angle

| | EFPs | PFA |
|---|---|---|
| angle ° | 114.8 | 105.8 |
| | 116.8 | 105.4 |
| | 115.6 | 103.7 |
| | 114.9 | 103.9 |
| | 113.9 | 104.8 |
| average | 115.2 | 104.72 |

In accordance with an illustrative and non-limiting embodiment of the present invention, an expanded fluoropolymer article produced according to the methods of the present invention has a water contact angle of at least 115°. In certain illustrative embodiments, the expanded fluoropolymer article has a water contact angle of about 117.86°.

In accordance with an illustrative and non-limiting embodiment of the present invention, an expanded fluoropolymer article produced according to the methods of the present invention has an acid contact angle of at least 113°. In certain illustrative embodiments, the expanded fluoropolymer article has an acid contact angle of about 115.2°.

T-Peel Test

Figure 11:
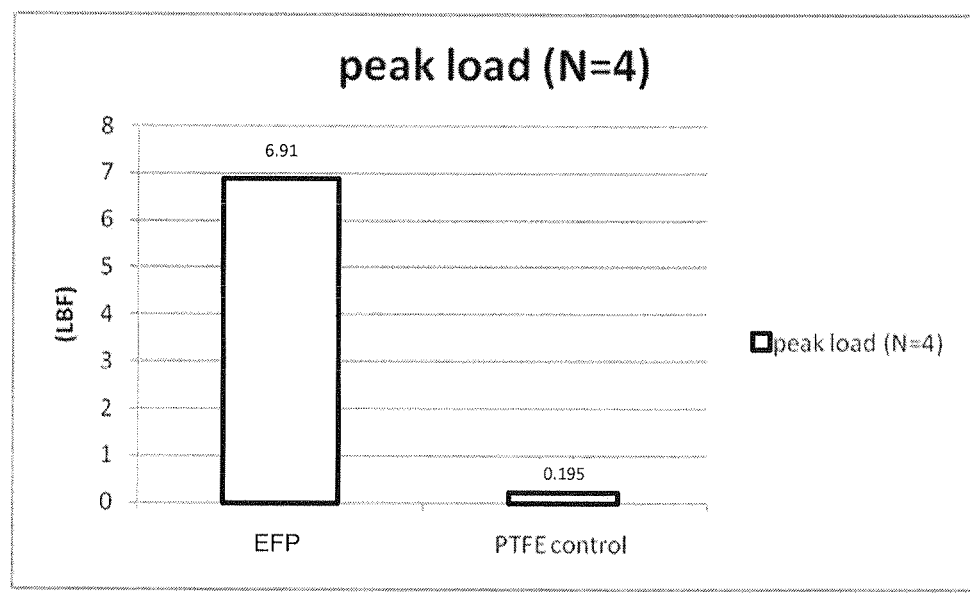
FIG. 11 is a bar graph illustrating the results of a T-peel test comparing the lamination strength of fluoropolymer articles produced according to one aspect of the present invention to the lamination strength of control articles made from ePTFE.

A T-peel test was performed to compare the relative peel resistance of bonds between layers of expanded fluoropolymer thermally bonded to each other (at the joint) without adhesive optionally applying a joining force according to the methods of the present invention and the relative peel resistance of bonds formed between layers of conventional ePTFE bonded to each other according to conventional methods. In certain illustrative embodiments, layers of expanded fluoropolymer can be thermally bonded together without adhesive by optionally applying a joining force (i.e., an active or passive force required to place the layers into intimate contact with each other in a particular configuration e.g., joined, sealed, laminated, etc.) to bring the layers into intimate contact with each other. The appropriate joining force for any particular intended application would be apparent to those skilled in the art. It should be appreciated that a joining force, which is brief application of a low magnitude force, is not a crushing force (e.g., a force involved in machine pressing or calendaring) which is a prolonged application of a moderate to high magnitude force. For the T-peel test, two layers of expanded fluoropolymer material processed according to the methods outlined herein were placed into intimate contact with each other by using a hand roller to apply a joining force to form a multi-layer expanded fluoropolymer article thermally bonded together along a joint without adhesive in a laminated configuration. The laminated multi-layer expanded fluoropolymer article was subsequently heated for 900 seconds at 360° Celsius. The results of the T-peel test are shown in FIG. 11. As shown in FIG. 11, the bonded layers of expanded fluoropolymers thermally bonded to each other along a joint without adhesive optionally applying a joining force according to the methods of the present invention unexpectedly and surprisingly have a significantly higher bond strength compared to control PTFE processed by conventional methods. In accordance with an illustrative and non-limiting embodiment of the present invention, an expanded fluoropolymer article of the present invention has a T-peel loading value of between about 6 lbf and about 8 lbf. In certain illustrative embodiments, the expanded fluoropolymer article of the present invention has a T-peel loading value of about 6.91 lbf. In certain illustrative embodiments, a multi-layer expanded fluoropolymer article of the present invention has a T-peel loading value of between 6 lbf and about 8 lbf. In certain illustrative embodiments, the multi-layer expanded fluoropolymer article of the present invention has a T-peel loading value of about 6.91 lbf.

Fourier Transform Infrared (FTIR) Analysis

Figure 12A:
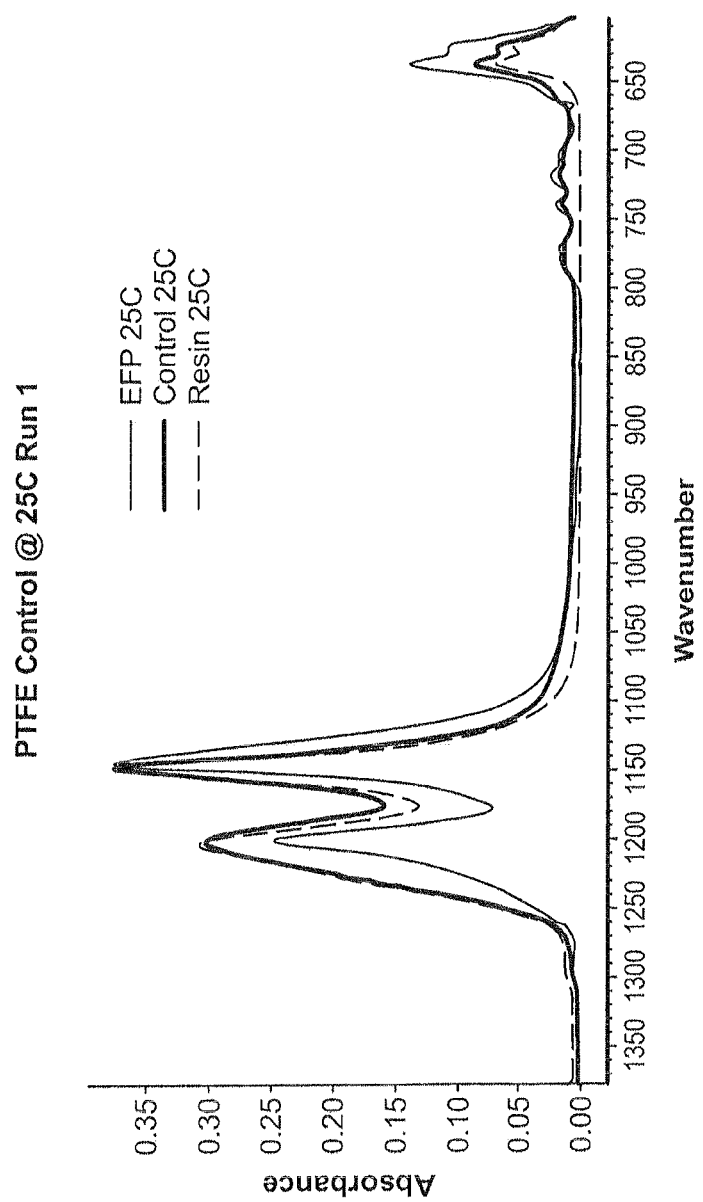
FIG. 12A is a Fourier Transform Infrared Analysis spectrum, performed at a temperature of 25° C., of a fluoropolymer article produced according to one aspect of the present invention compared to an unprocessed PTFE resin and PTFE processed using conventional methods.
Figure 12B:
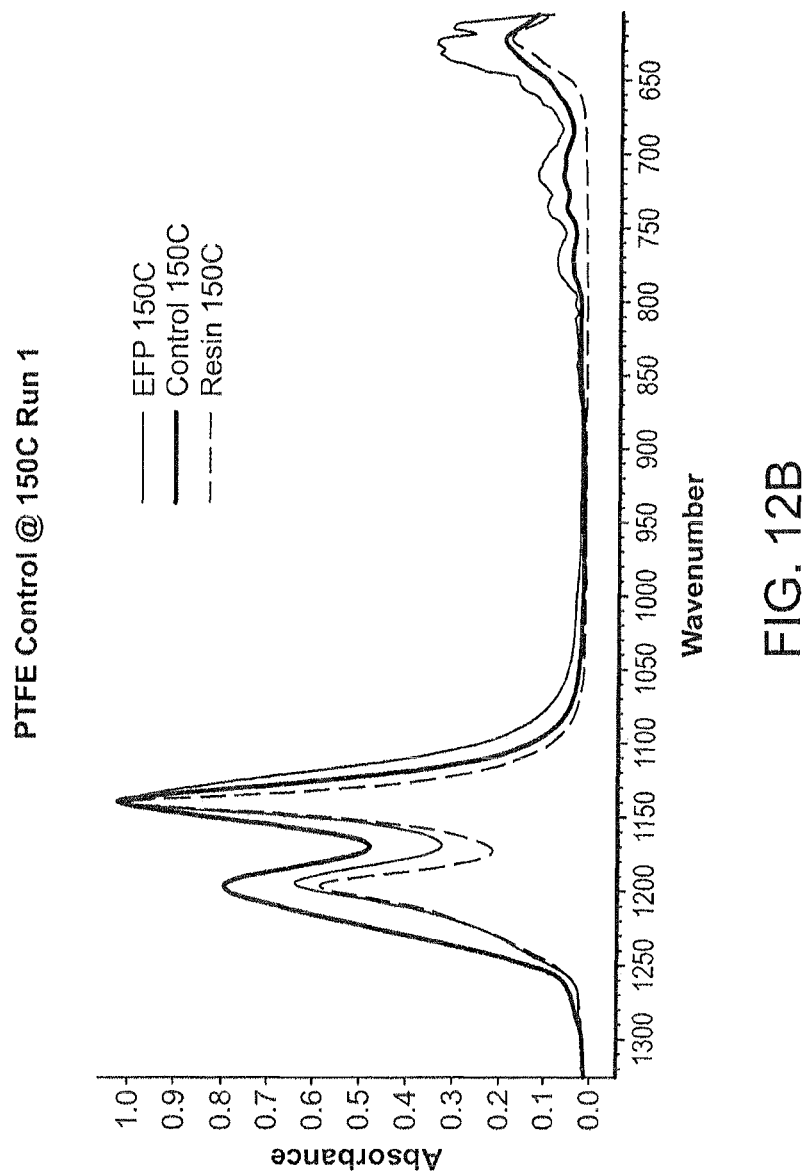
FIG. 12B is a Fourier Transform Infrared Analysis spectrum, performed at an elevated temperature of 150° C., of a fluoropolymer article produced according to one aspect of the present invention compared to an unprocessed PTFE resin and PTFE processed using conventional methods.
Figure 13A:
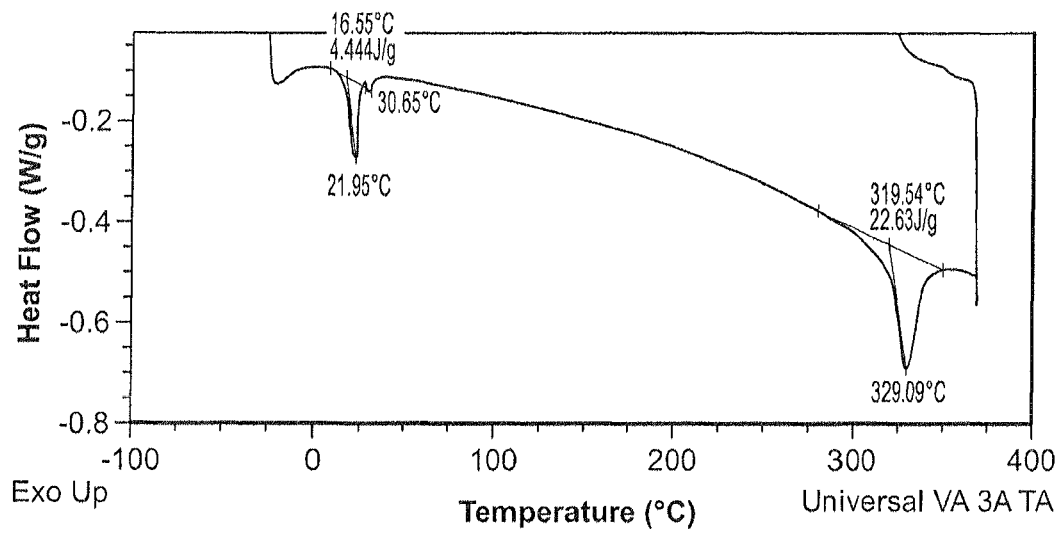
FIG. 13A is a differential scanning calorimetry thermogram of a control ePTFE article produced according to conventional methods.
Figure 13B:
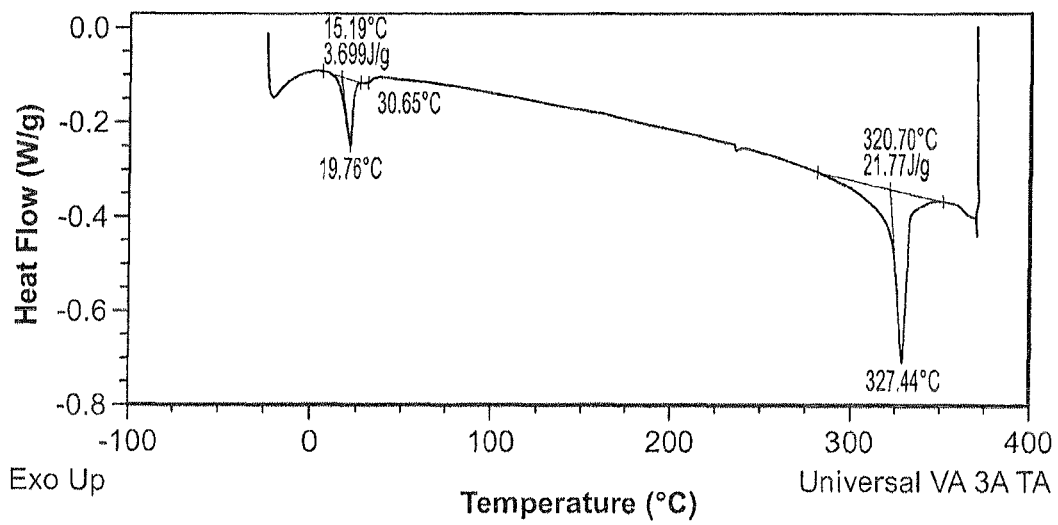
FIG. 13B is a differential scanning calorimetry thermogram of a fluoropolymer article produced according to one aspect of the present invention.
Figure 13C:
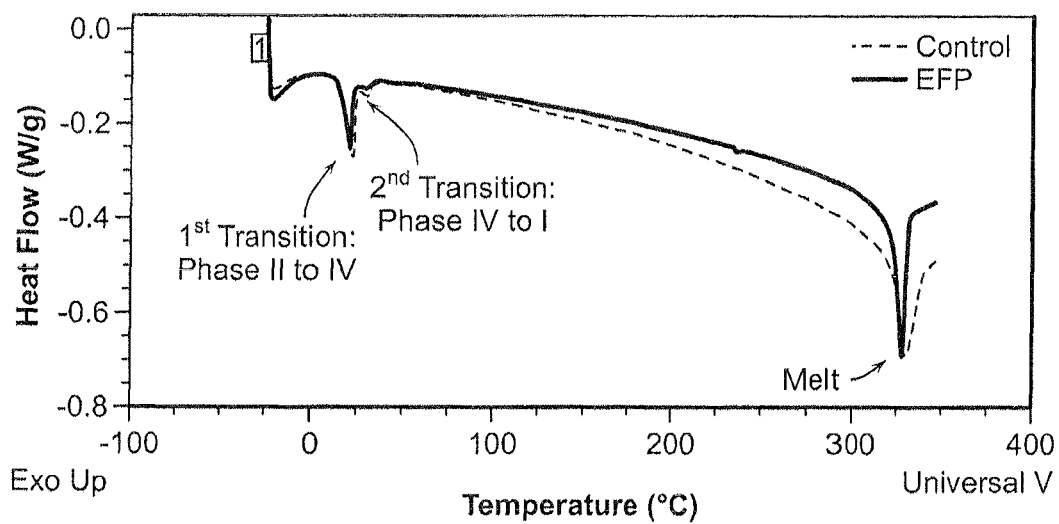
FIG. 13C is a differential scanning calorimetry thermograph of a control ePTFE overlaying a differential scanning calorimetry thermograph of a fluoropolymer article produced according to one aspect of the present invention.
Figure 13D:
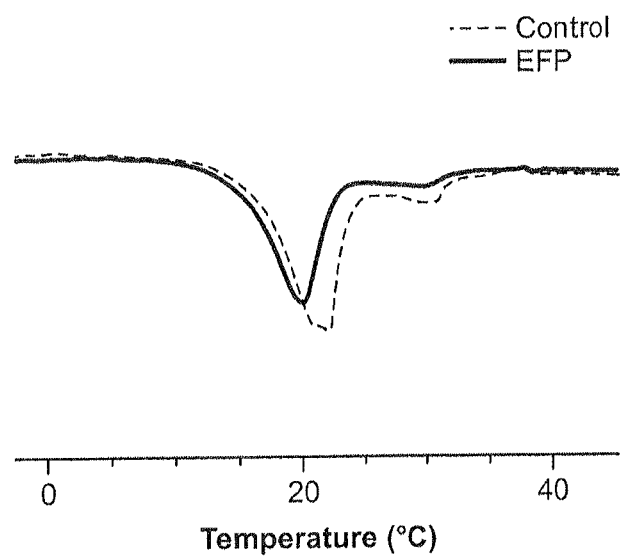
FIG. 13D is a zoomed in view of a first portion of the overlaid differential scanning calorimetry thermograph of FIG. 13C, showing the polymorph phase transition of the control ePTFE compared to the polymorph phase transition of the fluoropolymer article produced according to one aspect of the present invention.
Figure 13E:
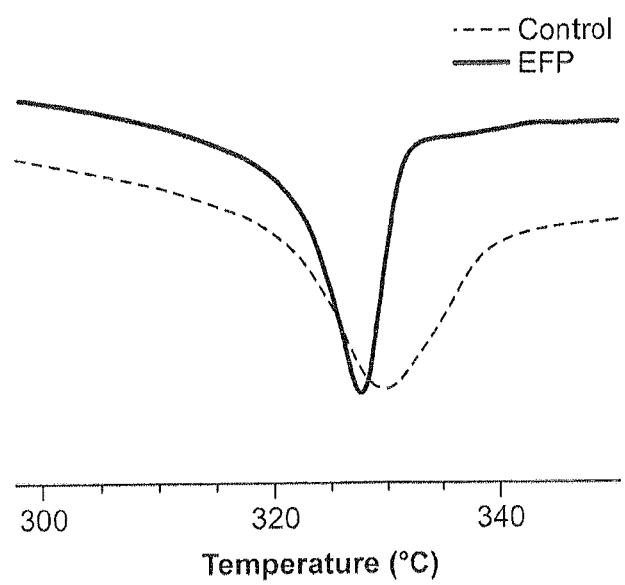
FIG. 13E is a zoomed in view of a second portion of the overlaid differential scanning calorimetry thermograph of FIG. 13C, showing the melt temperature transition of the control ePTFE compared to the melt temperature transition of the fluoropolymer article produced according to one aspect of the present invention.

Fourier Transform Infrared (FTIR) Analysis was used to characterize the chemistry and morphology of unprocessed PTFE resin, PTFE processed using methods described in the prior art, and an expanded fluoropolymer of the present invention (e.g., PTFE) processed using the methods of the present invention. FIGS. 12A and 12B show the FTIR spectrum resulting from the FTIR analysis performed at room temperature and an elevated temperature of 150° C., respectively. The results confirm all 3 materials are PTFE, however they clearly show a difference in amorphous content between them. Absorption bands at 1211, 1154, 640, 555, and 512 cm-1 are characteristic of crystalline PTFE, while bands between 700 and 800 cm-1 are characteristic of amorphous PTFE. The increased intensity and shape of bands between 700 and 800 cm-1 detected at both room temperature and elevated temperature in the expanded fluoropolymers of the present invention clearly demonstrate a greater amorphous or chain disorder content than conventional PTFE. In accordance with an illustrative and non-limiting embodiment of the present invention, an expanded fluoropolymer article produced according to the methods of the present invention has a greater amorphous fraction than PTFE, as detected by fourier transform infrared analysis.

Differential Scanning Calorimetry (DSC)

Differential Scanning calorimetry (DSC) is a thermal analytical technique used to characterize thermal properties of a material, including crystalline melting point and polymorph transitions. Peaks detected at room temperature are attributed to crystalline phase transitions while those detected above 320° C. are attributed to melt of the crystalline phase. A comparison of the results obtained between conventional PTFE and an expanded fluoropolymer produced according to the methods of the present invention is shown in FIGS. 13A, 13B, 13C, 13D and 13E and summarized in Table 9 below. The shift in room temperature transition from 21.95° C. to 19.78° C. demonstrates and confirms a difference in physical structure between the two materials. In addition, the reduction in energy of transition detected in the expanded fluoropolymer produced according to the methods of the present invention confirms a higher amorphous content. Analysis of the higher melt temperature transition provides additional confirmation that the expanded fluoropolymers produced according to the methods of the present invention are less crystalline and more amorphous. In accordance with an illustrative and non-limiting embodiment of the present invention, an expanded fluoropolymer article produced according to the methods of the present invention has a greater relative amorphous fraction than PTFE, characterized by a differential scanning calorimetry (DSC) thermogram exhibiting a phase transition of less than 20 degrees Celsius and a heat of fusion of less than 4.0 joules per gram.

TABLE 9

Summary of DSC Data: Expanded Fluoropolymer Produced According to the Methods of the Present Invention vs. Control.

| | Phase Transition II-IV | | Melt | |
|---|---|---|---|---|
| | Apex | Heat of Transition | Apex | Heat of Transition |
| Control | 21.95° C. | 4.444 J/g | 329.09° C. | 22.63 J/g |
| EFPs | 19.78° C. | 3.699 J/g | 327.44° C. | 21.77 J/g |
| Difference | −2.17° C. | −0.745 J/g | −1.65° C. | −0.86 J/g |

Dynamic Mechanical Analysis (DMA)

Figure 14:
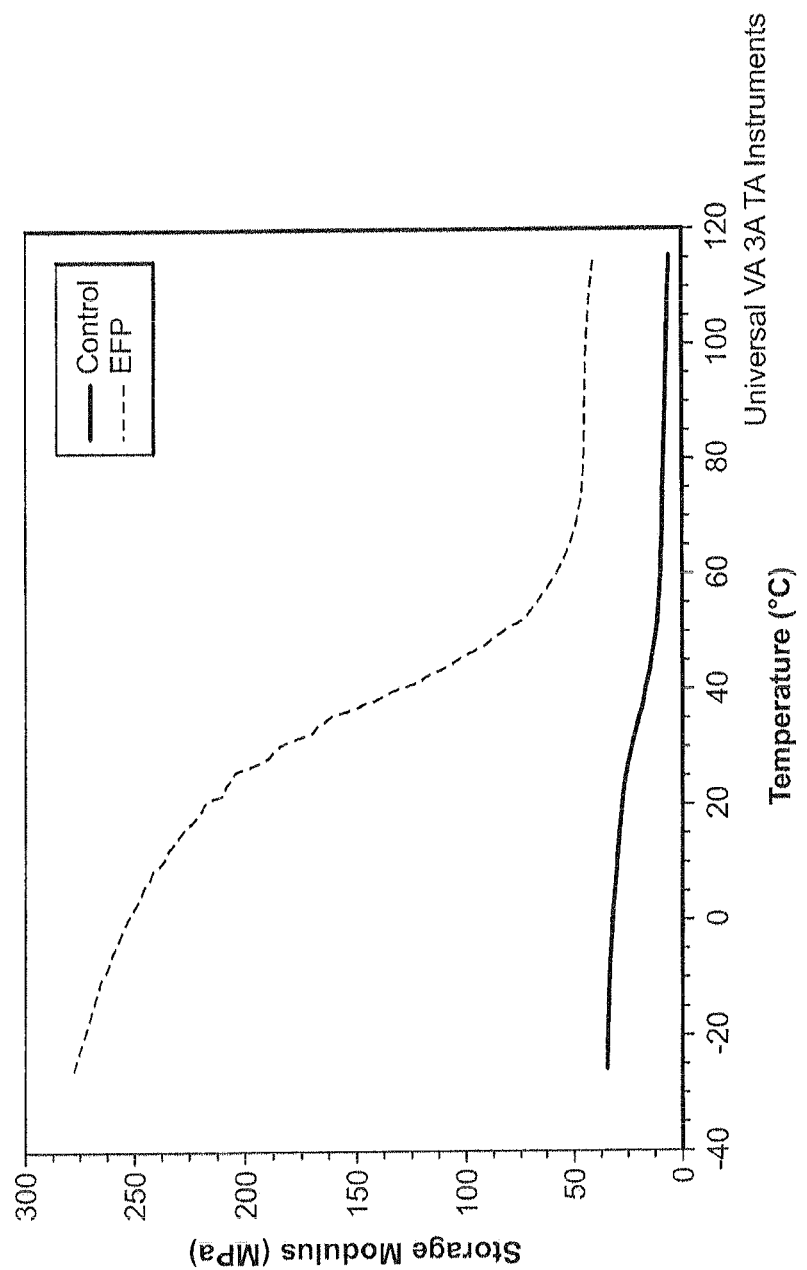
FIG. 14 is a line graph illustrating the results of dynamic mechanical analysis performed on a fluoropolymer article produced according to one aspect of the present invention compared to a control.
Figure 15:
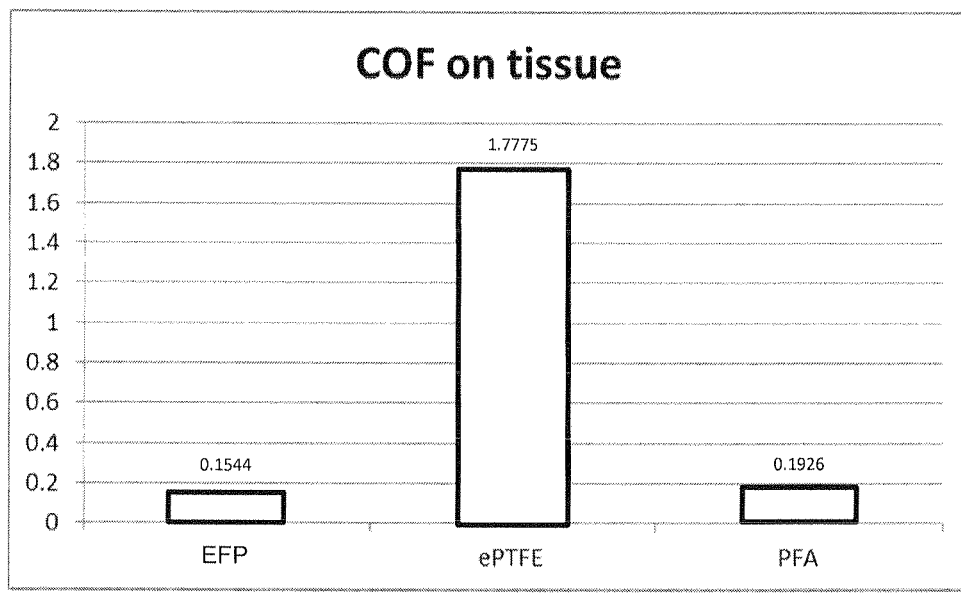
FIG. 15 is a bar graph illustrating a comparison of the coefficient of friction on tissue for a fluoropolymer article produced according to one aspect of the present invention compared to control articles made from PAF and ePTFE.
Figure 16:
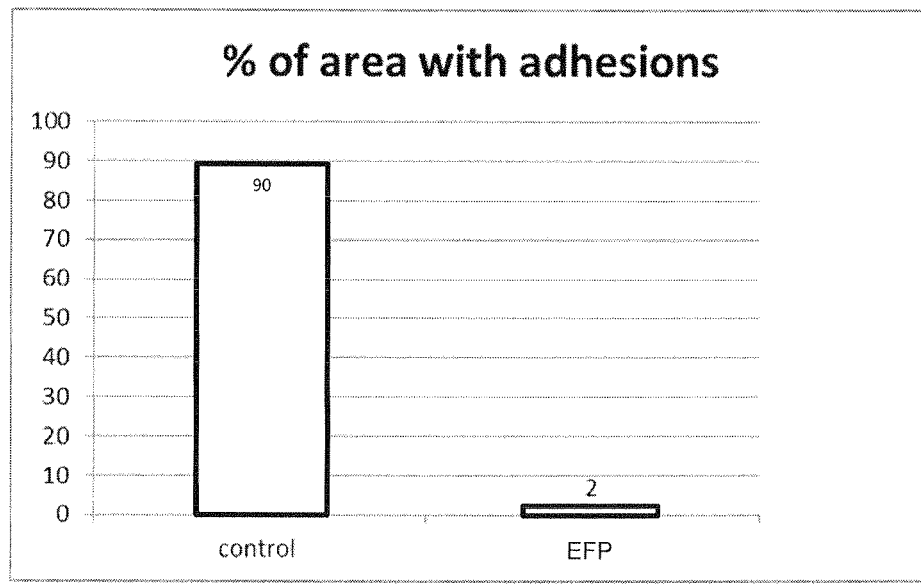
FIG. 16 is a bar graph showing the results of a pre-clinical study of the effectiveness of a fluoropolymer article produced according to one aspect of the present invention in preventing adhesion formation in a rabbit sidewall model compared to control animals which lacked the fluoropolymer article.
Figure 17A:
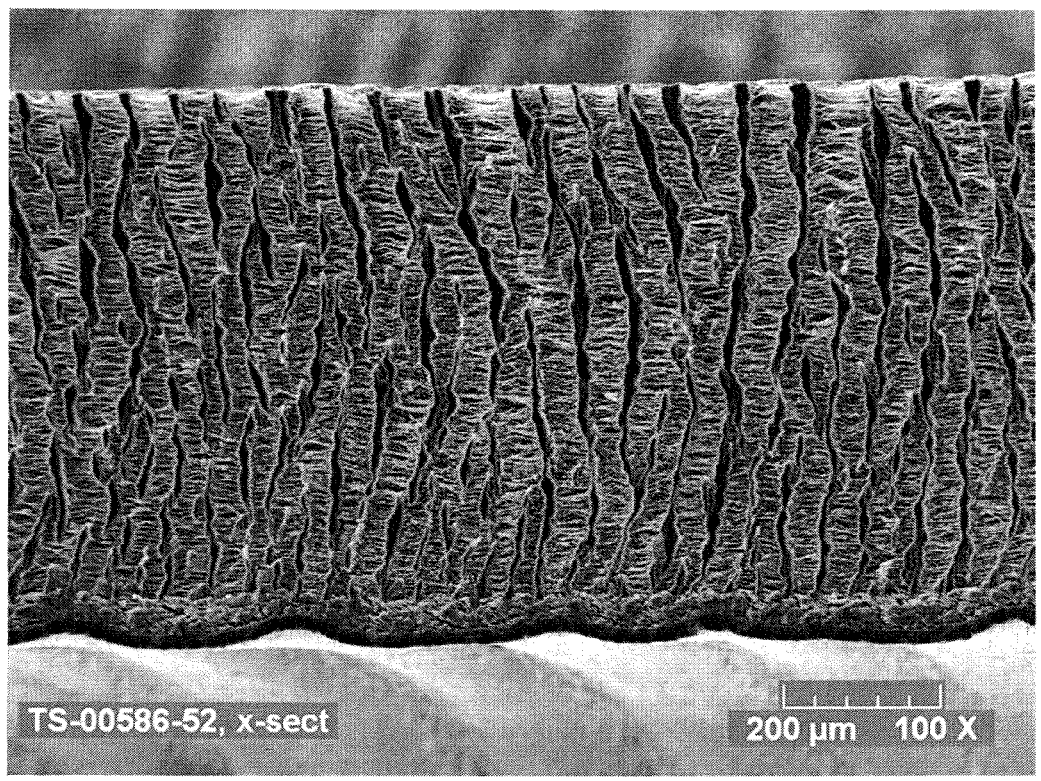
FIG. 17A is a scanning electron microscope (SEM) image of an ePTFE vascular graft with a fluoropolymer article, produced according to one aspect of the present invention and positioned placed on a luminal surface.
Figure 17B:
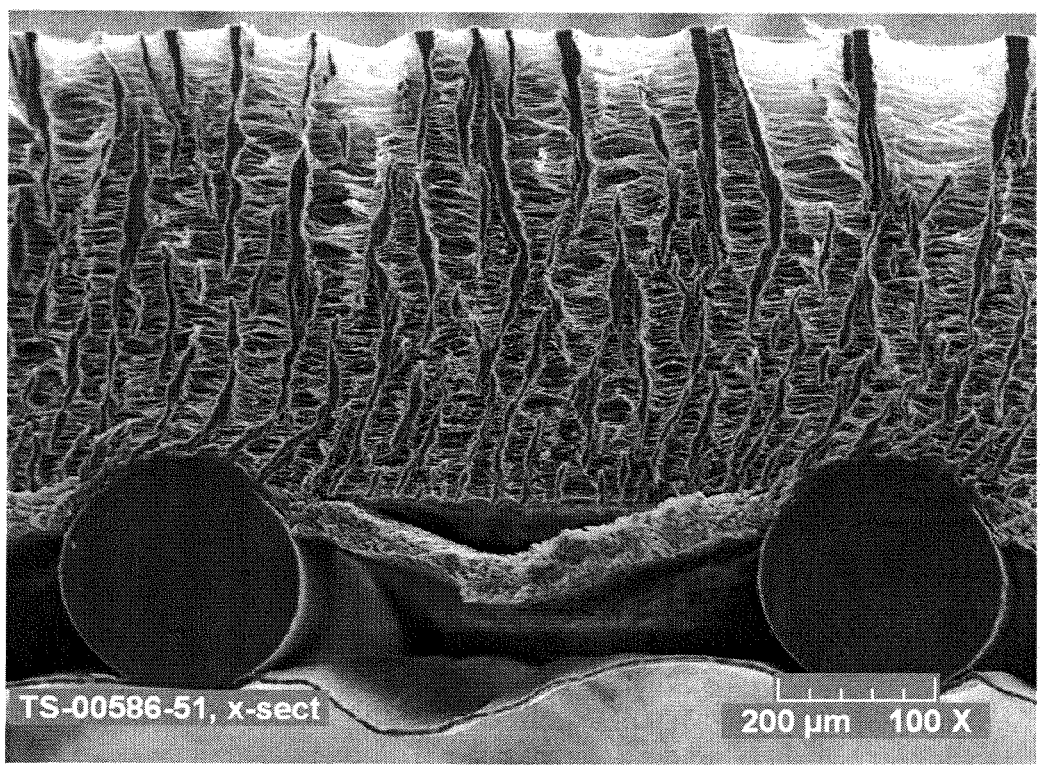
FIG. 17B is a scanning electron microscope (SEM) image of a ePTFE vascular graft with a fluoropolymer article, produced according to one aspect of the present invention and placed on the luminal surface.
Figure 17C:
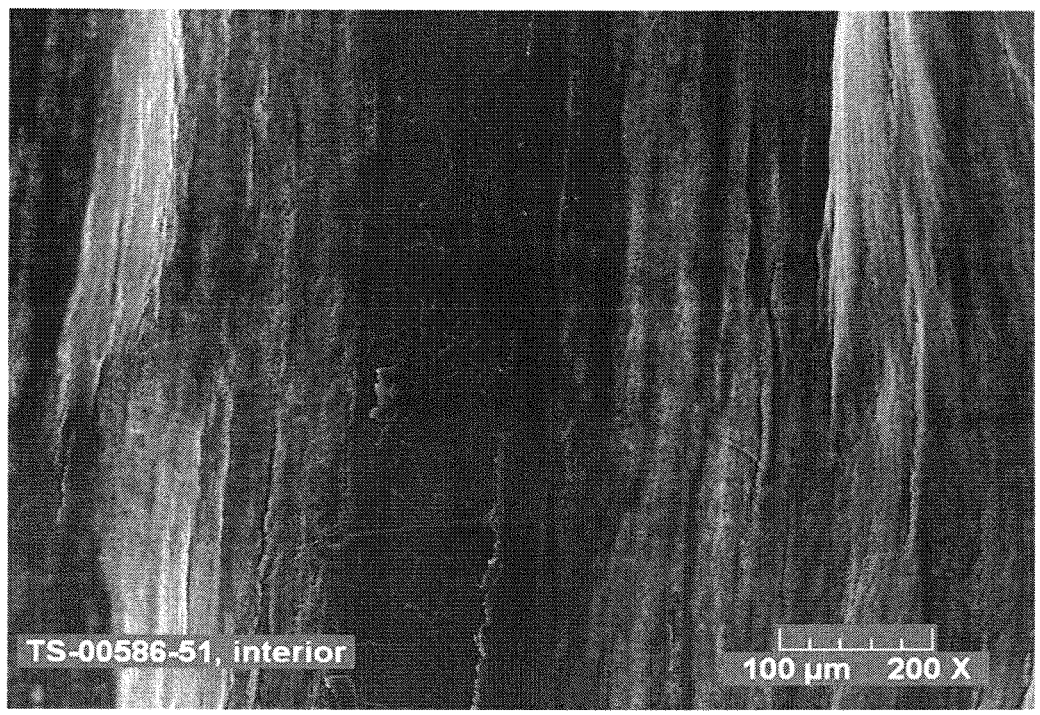
FIG. 17C is a scanning electron microscope (SEM) image of a fluoropolymer article produced according to one aspect of the present invention.

DMA measures the modulus (stiffness) properties of materials as they are deformed under periodic stress. These measurements provide information about the performance of materials. The storage modulus is a direct measurement of the energy stored, or elasticity in a material. The higher the storage modulus the more memory or elasticity the sample has. Higher storage modulus correlates to a sample with higher strength and improved stability. As shown in FIG. 14, the DMA results correlates well will the improved tensile results observed with the LTS and RTS test.

Coefficient of Friction (COF) on Tissue

Samples of expanded fluoropolymers produced according to the methods of the present invention and conventional ePTFE and PFA were tested to measure the coefficient of friction between those materials and tissue (bovine intestine), according to the procedure outlined below. The results for each of the samples are reported in Tables 10, 11 and 12. As is shown in Tables 10-12 below and in FIG. 15, the expanded fluoropolymers produced according to the methods of the present invention have a significantly lower coefficient of friction than the ePTFE material and a slightly lower COF compared to the PFA material. Coefficient of friction can be influenced by the morphology of the surfaces of the material, or a change in the orientation of the polymer chains.

1. A 8" section of cleaned bovine intestine is cut open along its length, the intestine is stretched and secured onto a disposable cutting board
2. The material to be tested is secured to the flat bottom of a 200 gram sled
3. The bovine intestine is irrigated with 2 ml of H20 (spread evenly on the surface)
4. The sled with the sample is placed onto the tissue a CHATILLON force gauge is attached to the sled the sled is pulled approximately 4" @5"minute. The maximum force to move the sled is recorded.
5. Coefficient of friction is calculated by dividing the maximum force by the weight of the sled.

TABLE 10

COF for EFPs

| maximum force (g) | coefficient of friction |
|---|---|
| 35.65 | 0.178 |
| 36.92 | 0.184 |
| 26.85 | 0.134 |
| 28.21 | 0.141 |

TABLE 10-continued

COF for EFPs

| | maximum force (g) | coefficient of friction |
|---|---|---|
| | 26.91 | 0.135 |
| Average | 30.908 | 0.1544 |

TABLE 11

COF for conventional ePTFE

| | maximum force (g) | coefficient of friction |
|---|---|---|
| | 345.5 | 1.72 |
| | 367.4 | 1.83 |
| | 322.5 | 1.61 |
| | 390.9 | 1.95 |
| Average | 356.575 | 1.7775 |

TABLE 12

COF for PFA

| | maximum force (g) | coefficient of friction |
|---|---|---|
| | 53.79 | 0.268 |
| | 41.45 | 0.207 |
| | 32.11 | 0.160 |
| | 32.43 | 0.162 |
| | 33.2 | 0.166 |
| Average | 38.596 | 0.1926 |

In accordance with an illustrative and non-limiting embodiment of the present invention, the methods described herein can be used to produce an expanded polymer. In certain illustrative embodiments, the expanded polymer comprises a wet-stretched expanded polytetrafluoroethylene (ePTFE) exhibiting both a higher amorphous fraction and a lower crystalline fraction than an expanded polymer formed from a comparative non-wet-stretched ePTFE, as characterized by a DSC thermogram. In certain embodiments, the DSC thermogram of the wet-stretched ePTFE exhibits a phase transition of at least 2 degrees Celsius less than the DSC thermogram of the wet-stretched ePTFE. In certain embodiments, the DSC thermogram of the wet-stretched ePTFE exhibits a heat of fusion of 0.75 joules per mole less than the DSC thermogram of the wet-stretched ePTFE.

In accordance with an illustrative and non-limiting embodiment of the present invention, the wet-stretched ePTFE is capable of being thermally bonded to itself without adhesive, crushing force, or application of a chemical treatment to the wet-stretched ePTFE. In certain illustrative embodiments, the wet-stretched ePTFE is thermally bonded to itself without using an adhesive. In certain illustrative embodiments, the wet-stretched ePTFE is thermally bonded to itself without applying a crushing force to the wet-stretched ePTFE. In certain illustrative embodiments, the wet-stretched ePTFE is thermally bonded to itself without application of a chemical treatment to the wet-stretched ePTFE. In certain illustrative embodiments, two or more articles comprising wet-stretched ePTFE can be thermally bonded together without using an adhesive, without applying a crushing force, or without applying a chemical treatment to the wet-stretched ePTFE. It should be apparent to one skilled in the art that thermally bonding wet-stretched ePTFE to itself or together with another article comprising wet-stretched ePTFE can result in a variety of configurations (e.g., joined, sealed, or laminated, etc.).

In certain illustrative embodiments, the expanded fluoropolymer material has a joint strength greater than the material strength of expanded polytetrafluoroethylene when at least a portion of the expanded fluoropolymer is sintered to itself in a joined configuration. In some embodiments, such expanded fluoropolymer can be produced by a process comprising the steps of (a) stretching a liquefied fluoropolymer material to form an expanded fluoropolymer material; and (b) sintering at least the portion of the expanded fluoropolymer material to itself to in the joined configuration to yield the expanded fluoropolymer material having the joint strength greater than the material strength of expanded polytetrafluoroethylene.

In certain illustrative embodiments, the expanded fluoropolymer has a bond strength at the joint greater than the bond strength of the material itself when at least a portion of the wet-stretched fluoropolymer is sintered to itself in a joined configuration, produced by a process comprising the steps of (a) stretching a wetted fluoropolymer material to form a wet-stretched fluoropolymer material; (b) removing the wetting agent from the wet-stretched fluoropolymer material while portions of the wet-stretched fluoropolymer material are in intimate contact with each other after stretching the wetted fluoropolymer material; and optionally (c) sintering the at least the portion of the expanded fluoropolymer material to itself to in the joined configuration to yield the wet-stretched fluoropolymer material having the bond strength at the joint greater than the bond strength of the material itself.

In accordance with an illustrative and non-limiting embodiment of the present invention, the methods described herein can be used to produce a product comprising at least one component of which is constructed from an expanded fluoropolymer material. In certain illustrative embodiments, the expanded fluoropolymer material comprises a liquid-impermeable, shape-formable wet-stretched fluoropolymer material having at least a portion of the wet-stretched fluoropolymer material sintered to itself in a joined configuration. In some embodiments, the joint strength of the expanded fluoropolymer material is at least 7 times greater than the joint strength of an expanded polytetrafluoroethylene material similarly configured.

In certain illustrative embodiments, the product is a medical device. In some embodiments, the medical device is a graft. In some embodiments, the medical device is a conduit or catheter. In some embodiments, the medical device is a bariatric liner.

In certain illustrative embodiments, the at least one component comprises a balloon. In certain illustrative embodiments, the at least one component comprises a stent covering.

In accordance with an illustrative and non-limiting embodiment of the present invention, the methods described herein can be used to produce a polymorph of polytetrafluoroethylene (PTFE). In certain illustrative embodiments, the polymorph of PTFE has an amorphous fraction characterized by a differential scanning calorimetry (DSC) thermogram exhibiting a phase transition of less than 20 degrees Celsius and a heat of fusion of less than 4.0 joules per gram. In certain embodiments, the polymorph of PTFE has an amorphous fraction characterized by a DSC thermogram exhibiting a phase transition of about 19.78 degrees Celsius and a heat of fusion of about 3.699 joules per gram.

In some embodiments, the polymorph is thermally bonded to itself without an adhesive. In some embodiments, the polymorph is thermally laminated to itself without an adhesive. In some embodiments, the polymorph is thermally sealed to itself without an adhesive. In some embodiments, the polymorph is thermally joined to itself.

In certain illustrative embodiments, the PTFE polymorph is a low crystallinity polymer as compared to PTFE, wherein PTFE is a high crystallinity polymer. In certain embodiments, the lower crystallinity polymer has a melting point as determined by DSC that is less than the melting point of the high crystallinity polymer.

Expanded fluoropolymers of the present invention (e.g., an expanded fluoropolymer thermally bonded to itself without an adhesive according to the methods of the present invention) can be used in numerous and varied applications ranging from bio-materials to industrial applications. Exemplary bio-materials applications include grafts (e.g., aortic grafts, vascular grafts, a dialysis graft, a peripheral graft, etc.), conduits used in the gastrointestinal tract (e.g., a gastrointestinal tube), covering for stents (e.g., a balloon expandable covered stent), a covering material for wound care, embolic filters, liners (e.g., an abdominal liner, a gastrointestinal liner, etc.), medical balloons for angioplasty stent deployment or medicinal delivery, products for soft tissue repair, products to reduce surgical adhesions or tissue attachment to medical devices these can include a pouch of pocket for a pacemaker or implanted insulin pump, the material can also be used as a space occupying device to maintain the shape of an organ or passageway during or after surgery, or as a patch (e.g., vessel or vascular path, hernia patch, etc.) or wrap. Exemplary and non-limiting industrial applications include, but are not limited to, a performance material for clothing or apparel including shoes, socks, pants, shirts, under garments, gloves, hats and outerwear (jackets, parkas etc. . . . ) liners for small or large storage vessels, protective packaging or cases, or as a protective barrier layer for use with fabrics.

Expanded fluoropolymers produced according to the methods of the present invention provide a number of advantages over expanded fluoropolymers produced according to conventional methods. For example, expanded fluoropolymers of the present invention (e.g., an expanded fluoropolymer thermally bonded to itself without an adhesive) impart any or all of the following advantages compared to PFA or conventionally processed ePTFE: increased density, decreased or eliminated porosity, increased tensile strength, increased radial tensile strength, x-direction strength at the bonds between the expanded fluoropolymers greater than the x-direction strength of the expanded fluoropolymers themselves, decreased crystallinity and increased amorphousness, an ability to expand to a larger ratio, the ability to thermally bond to themselves without using or requiring an adhesive, crushing force or other chemical or physical surface treatment, such as chemical etching, plasma etching, corona treatment, and a lower friction force to overcome.

EXAMPLE 1

EFP Abdominal or Bariatric Liner

In accordance with an illustrative and non-limiting embodiment of the present invention, an expanded fluoropolymer produced according to the methods of the present invention is used to form a film useful as a bariatric or abdominal liner that can serve as a temporary protective barrier during or after surgery, for example, abdominal or pelvic surgery. The abdominal liner can be a multi-layered expanded fluoropolymer article, e.g., as substantially shown in FIG. 2A, but can have many different shapes as would be appreciated by those of skill in the art. The bariatric liner can be a tube or sleeve of material anchored in the GI tract to prevent or reduce absorption of nutrients (calories) to induce weight loss. The abdominal liner formed from the expanded fluoropolymers of the present invention cover the contents of the abdomen during open or laparoscopic surgery to prevent or minimize desiccation or abrasion type injuries during surgery. The abdominal liner film can be left in place for approximately 14 days after the surgery to prevent adhesion formation. At 14 days post op the film can be removed through a small incision or trocar port.

Pre-Clinical Study

A preclinical study to evaluate the efficacy of a thin film comprising an expanded fluoropolymer produced according to the methods of the present invention toward covering the bowel on the formation of adhesions between the sidewall and cecum and bowel in a rabbit model.

Sidewall Model

Rabbits were anesthetized with a mixture of 55 mg/kg ketamine hydrochloride and 5 mg/kg Rompum intramuscularly. Following preparation for sterile surgery, a midline laparotomy was performed. The cecum and bowel were exteriorized and digital pressure was exerted to create subserosal hemorrhages over all surfaces. The damaged intestine was then lightly abraded with 4" 4×4 ply sterile gauze until punctate bleeding is observed. A 5×3 cm area of peritoneum and transversus abdominous muscle were removed on the right lateral abdominal wall. The thin film comprising expanded fluoropolymer produced according to the methods of the present invention was inlaid into the peritoneal cavity to cover a large portion of the bowel creating a barrier between the bowel and the defect. The cecum and bowel were then returned to their normal anatomic position. The incision was gently closed in two layers with 3-0 VICRYL, suture. Care was taken not to damage the bowel.

After 14 days, the rabbits were anesthetized. After anesthesia, a small incision was made to remove the membrane. The animals were then terminated and the percentage of the sidewall injury area involved in adhesions was determined. In addition, the tenacity of the adhesions was scored using the system in Table 13 below.

TABLE 13

| | Adhesion Scoring System |
|---|---|
| 0 | No Adhesions |
| 1 | mild, easily dissectible adhesions |
| 2 | moderate adhesions; non-dissectible, does not tear the organ |
| 3 | dense adhesions; non-dissectible, tears organ when removed |

Data Analysis

A reduction in the area of adhesions was analyzed by the Student's t-test. The statistical significance of the incidence was analyzed using a Chi-Square test. The tenacity scores were analyzed by analysis of variance of the ranks.

Results

The film comprising expanded fluoropolymer produced according to the methods of the present invention was easily handled and applied to the peritoneum. All animals did well during the post-operative interval. In four of five animals, the film stayed at the site of placement. In the last animal, the material had moved from the site of placement and balled around the omentum. No inflammation was observed in any animal. At necropsy, the film was easily removed in 3 animals. In one animal, the edge of the material was involved in the adhesions that formed and it was difficult to remove. In the animal where the film had moved from the site of placement, the film was not found until the animal was opened after euthanasia.

As is shown in Tables 14 and 15 below, the expanded fluoropolymer film significantly reduced the area, incidence and tenacity of adhesions.

TABLE 14

Adhesion Scores for Animals Implanted with PTFE TS 00586

| Animal Number | Area Score | Tenacity Score |
|---|---|---|
| 8201 | 0 | 0 |
| 8202 | 0 | 0 |
| 8205 | 0 | 0 |
| 8206 | 0 | 0 |
| 8211 | 10 | 1 |
| Mean/SEM | 2/1.0 | 3.0/0.59 |

*This is the Mean/SEM of the rank of the score.

TABLE 15

Adhesion Scores for Control Animals

| Animal Number | Area Score | Tenacity Score |
|---|---|---|
| 8203 | 100 | 2 |
| 8204 | 50 | 2 |
| 8206 | 100 | 2 |
| 8207 | 100 | 3 |
| 8209 | 100 | 3 |
| Mean/SEM | 90/5.0 | 8/.068 |

*This is the Mean/SEM of the rank of the score.

The follow results of the pre-clinical study were notable:
97.78% reduction in adhesions compared to the control group (FIG. 16)
4 out of the 5 test animals completely adhesion free
No adverse events or health concerns with the animals tested
No inflammation observed in any of the animals
In 3 of the 5 test animals the test material was easily removed through a small incision
Material migration was minimal despite no active fixation

EXAMPLE 2

EFP Vascular Grafts

Luminal Surface

In accordance with an illustrative and non-limiting embodiment of the present invention, an expanded fluoropolymer produced according to the methods of the present invention can be used to form a luminal surface of a vascular graft. Without being bound by theory, it is believed that the non-porous structure of the expanded fluoropolymers produce according to the methods of the present invention can prevent or reduce protein and fibrin deposition onto the luminal surface of vascular grafts, with the end result being decreased thrombus formation.

Feasibility studies using the expanded fluoropolymers produced according to the methods of the present invention as the inner most layer of a multi-layered, laminated vascular graft continue to be conducted. Preliminary SEM analysis and bench testing results performed on two such grafts are provided in Table 16 below.

TABLE 16

Preliminary SEM and Bench Testing Results for

| graft type | EFP base, ePTFE tape vs graft as a cover (TS-00586-52) | EFP base, .010 PTFE monofilament ePTFE tape vs graft as a cover (TS-00586-51) |
|---|---|---|
| LTS (lbf) | 50 | 53 |
| RTS (lbf) | 78 | 114 |
| suture (lbf) | 2.5 | 3 |
| WEP (mmHg) | *600+ | *600+ |
| wall thickness | .024" | .031" |

*Equipment limit reached

EXAMPLE 3

EFP Stent Cover

In accordance with an illustrative and non-limiting embodiment of the present invention, an expanded fluoropolymer produced according to the methods of the present invention can be used to form a stent cover. Without being bound by theory, it is believed that the non-porous structure of the expanded fluoropolymers produce according to the methods of the present invention can prevent or reduce protein and fibrin deposition on the inside surface of the stent cover. The expanded fluoropolymer(s) can be included in any stent, as would be appreciated by one of skill in the art upon reading the present specification.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A multi-layer expanded fluoropolymer article comprising at least two layers of wet stretched non-porous expanded fluoropolymer thermally bonded together without an adhesive so that the bond at the interface between the two layers of wet stretched non-porous expanded fluoropolymer has a strength that is greater than the strength of the wet stretched non-porous expanded fluoropolymer, wherein the at least two layers are arranged such that the entire surface of each individual layer forms bonds with an entire surface of each adjacent layer and each layer is arranged in a vertical relationship with respect to each adjacent layer, wherein the bonds have a z-direction strength that is greater than a z-direction strength of any individual layer, and wherein each layer has a laminar cross-sectional structure.

2. The article of claim 1, wherein the article is shaped to form a sheet, a film, a tube, a balloon, or a 3-d shape.

3. The article of claim 2, wherein the bonds comprise a combination of bonds.

4. The article of claim 3, wherein the combination of bonds is selected from the group consisting of covalent bonds, van der Walls forces, hydrogen bonds, ionic bonds, electrostatic interactions and changes created in the chain entanglement of the expanded fluoropolymer.

5. The article of claim 3, wherein the combination of bonds comprises covalent bonds.

6. The article of claim 3, wherein the combination of bonds comprises van der Walls forces.

7. The article of claim 3, wherein the combination of bonds comprises hydrogen bonds.

8. The article of claim 3, wherein the combination of bonds comprises ionic bonds.

9. The article of claim 3, wherein the combination of bonds comprises electrostatic interactions.

10. The article of claim 3, wherein the combination of bonds comprises changes created in the chain entanglement of the expanded fluoropolymer.

11. The article of claim 1, wherein the bonds comprise a combination of bonds.

12. The article of claim 11, wherein the combination of bonds is selected from the group consisting of covalent bonds, van der Walls forces, hydrogen bonds, ionic bonds, electrostatic interactions and changes created in the chain entanglement of the expanded fluoropolymer.

13. The article of claim 11, wherein the combination of bonds comprises covalent bonds.

14. The article of claim 11, wherein the combination of bonds comprises van der Walls forces.

15. The article of claim 11, wherein the combination of bonds comprises hydrogen bonds.

16. The article of claim 11, wherein the combination of bonds comprises ionic bonds.

17. The article of claim 11, wherein the combination of bonds comprises electrostatic interactions.

18. The article of claim 11, wherein the combination of bonds comprises changes created in the chain entanglement of the expanded fluoropolymer.

19. A method of making a multi-layer expanded fluoropolymer article, wherein the article is the multi-layer expanded fluoropolymer article according to claim 1, wherein the method includes the steps of:
    providing each of a first wet stretched non-porous fluoropolymer layer and a second wet stretched non-porous fluoropolymer layer;
    placing a portion of the first wet stretched non-porous fluoropolymer layer in intimate contact with a portion of the second wet stretched non-porous fluoropolymer layer while each of the first and second wet stretched non-porous fluoropolymer layers are wet with a wet-stretch wetting agent;
    while in intimate contact, removing the wet-stretch wetting agent at least from the portion of each of the first and second wet stretched non-porous fluoropolymer layers; and
    subsequent to or simultaneous with removing the wet-stretch wetting agent at least from the portion of each of the first and second wet stretched non-porous fluoropolymer layers, heating at least the portion of each of the first and second wet stretched non-porous fluoropolymer a layers while in intimate contact.

20. The article of claim 1, wherein the article is non-porous.

21. A multi-layer expanded fluoropolymer article comprising at least two layers of identical wet stretched expanded fluoropolymer thermally bonded together without an adhesive so that the bond at the interface between the two layers of identical wet stretched expanded fluoropolymer has a strength that is greater than the strength of the wet stretched expanded fluoropolymer, and wherein each layer has a laminar cross-sectional structure.

22. The multi-layer expanded fluoropolymer article of claim 21, wherein the at least two identical layers of wet stretched expanded fluoropolymer constitute different portions of an expanded fluoropolymer article bonded to itself.

23. The article of claim 21, wherein each layer is arranged in a vertical relationship with respect to each adjacent layer.

24. The article of claim 21, wherein the bonds have a z-direction strength that is greater than a z-direction strength of any individual layers.

25. The article of claim 21, wherein each layer is arranged in a horizontal relationship with respect to each adjacent layer.

26. The article of claim 21, wherein the bonds have an x-direction tensile strength that is greater than an x-direction tensile strength of the expanded fluoropolymer layers.

27. A multi-layer expanded fluoropolymer article comprising at least two layers of wet stretched expanded fluoropolymer thermally bonded together without an adhesive so that the bond at the interface between the two layers of wet stretched expanded fluoropolymer has a strength that is greater than the strength of the wet stretched expanded fluoropolymer, wherein the wet stretched expanded fluoropolymer of each of the two layers is made of the same material.

28. A multi-layer expanded fluoropolymer article comprising at least two layers of non-porous wet stretched expanded fluoropolymer thermally bonded together without an adhesive so that the bond at the interface between the two layers of non-porous stretched expanded fluoropolymer has a strength that is greater than the strength of the non-porous wet stretched expanded fluoropolymer, and wherein each layer has a laminar cross-sectional structure.

29. The article of claim 28, wherein the article is non-porous.

30. A multi-layer expanded fluoropolymer article comprising at least two layers of wet stretched non-porous expanded fluoropolymer thermally bonded together without an adhesive so that the bond at the interface between the two layers of wet stretched non-porous expanded fluoropolymer has a strength that is greater than the strength of the wet stretched non-porous expanded fluoropolymer, wherein each layer is arranged such that a portion of the surface of each individual layer overlaps each adjacent layer and the overlapping portion of each adjacent layer forms bonds with each other.

31. A multi-layer expanded fluoropolymer article comprising at least two layers of wet stretched non-porous expanded fluoropolymer thermally bonded together without an adhesive so that the bond at the interface between the two layers of wet stretched non-porous expanded fluoropolymer has a strength that is greater than the strength of the wet stretched non-porous expanded fluoropolymer, wherein the at least two layers are arranged such that the entire surface of each individual layer forms bonds with an entire surface of each adjacent layer and each layer is arranged in a vertical relationship with respect to each adjacent layer, wherein the bonds have a z-direction strength that is greater than a z-direction strength of any individual layer.

32. A multi-layer expanded fluoropolymer article comprising at least two layers of non-porous wet stretched expanded fluoropolymer thermally bonded together without an adhesive so that the bond at the interface between the two layers of non-porous wet stretched expanded fluoropolymer has a strength that is greater than the strength of the non-porous wet stretched expanded fluoropolymer.

* * * * *